(12) United States Patent
Suzanne

(10) Patent No.: US 8,899,876 B2
(45) Date of Patent: Dec. 2, 2014

(54) FACILITY AND METHOD FOR STORING DANGEROUS MATERIALS PACKAGED INTO CONTAINERS

(76) Inventor: Jean-Marc Suzanne, Carry le Rouet (FR)

( * ) Notice: Subject to any disclaimer, the term of this patent is extended or adjusted under 35 U.S.C. 154(b) by 573 days.

(21) Appl. No.: 13/260,339

(22) PCT Filed: Mar. 30, 2010

(86) PCT No.: PCT/FR2010/050582
§ 371 (c)(1),
(2), (4) Date: Oct. 11, 2011

(87) PCT Pub. No.: WO2010/119205
PCT Pub. Date: Oct. 21, 2010

(65) Prior Publication Data
US 2012/0039694 A1  Feb. 16, 2012

(30) Foreign Application Priority Data

Apr. 14, 2009 (FR) .................................. 09 52428

(51) Int. Cl.
*B09B 1/00* (2006.01)
*E04H 5/02* (2006.01)
*B65G 63/04* (2006.01)

(52) U.S. Cl.
CPC ................ *E04H 5/02* (2013.01); *B65G 63/045* (2013.01)
USPC .................................... 405/129.7; 405/129.6

(58) Field of Classification Search
USPC ........... 414/266, 267, 281, 268, 339; 405/53, 405/129.45, 129.55, 129.6, 129.57, 129.7; 52/134, 136; 588/250, 259, 260, 1
See application file for complete search history.

(56) References Cited

U.S. PATENT DOCUMENTS

| 4,842,774 A * | 6/1989 | Golden ........................... 588/16 |
| 4,844,840 A * | 7/1989 | Feizollahi ....................... 588/17 |
| 4,950,105 A * | 8/1990 | Meess et al. ............. 405/129.57 |
| 5,387,741 A * | 2/1995 | Shuttle .......................... 588/259 |
| 5,763,735 A * | 6/1998 | Stahl .............................. 588/16 |
| 5,920,602 A * | 7/1999 | Botzem et al. ................ 376/272 |

FOREIGN PATENT DOCUMENTS

| DE | 10040699 | 3/2002 |
| FR | 2653812 | 5/1991 |

* cited by examiner

*Primary Examiner* — Saul Rodriguez
*Assistant Examiner* — Glenn Myers
(74) *Attorney, Agent, or Firm* — Ladas & Parry LLP

(57) ABSTRACT

The present invention relates to a semi-buried facility for storing dangerous materials packaged into containers (10), including: at least one cell (2) defined by buried vertical firewalls (3*a*) forming a pit containing said containers; and each cell being surrounded by a chamber including vertical firewalls (7*a*) extending above the ground; and at least one container (10) depositing and receiving area (6; 25), such as a roadway (6) for trucks (6*a*), and/or an area (25) for handling containers (10) from or to a railway transport line (22); and a corridor-shaped depositing area (5) inside each of said chambers between each of said buried cells and a longitudinal chamber wall (7*a*); and a motor-driven container handling gantry crane (8) capable of moving one of said containers (8*c*) that has been suspended to a height greater than that of said chamber walls (7*a*).

16 Claims, 15 Drawing Sheets

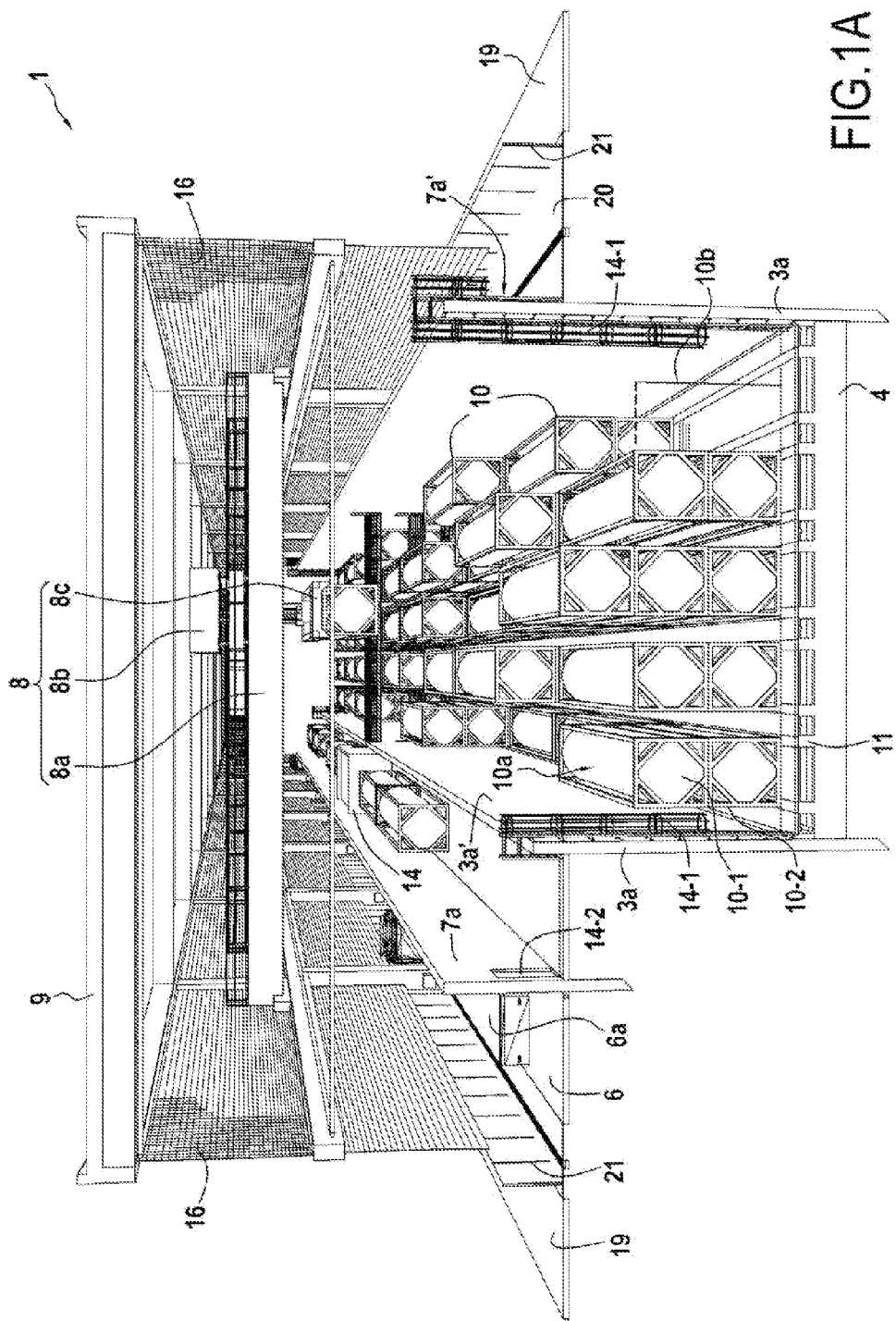

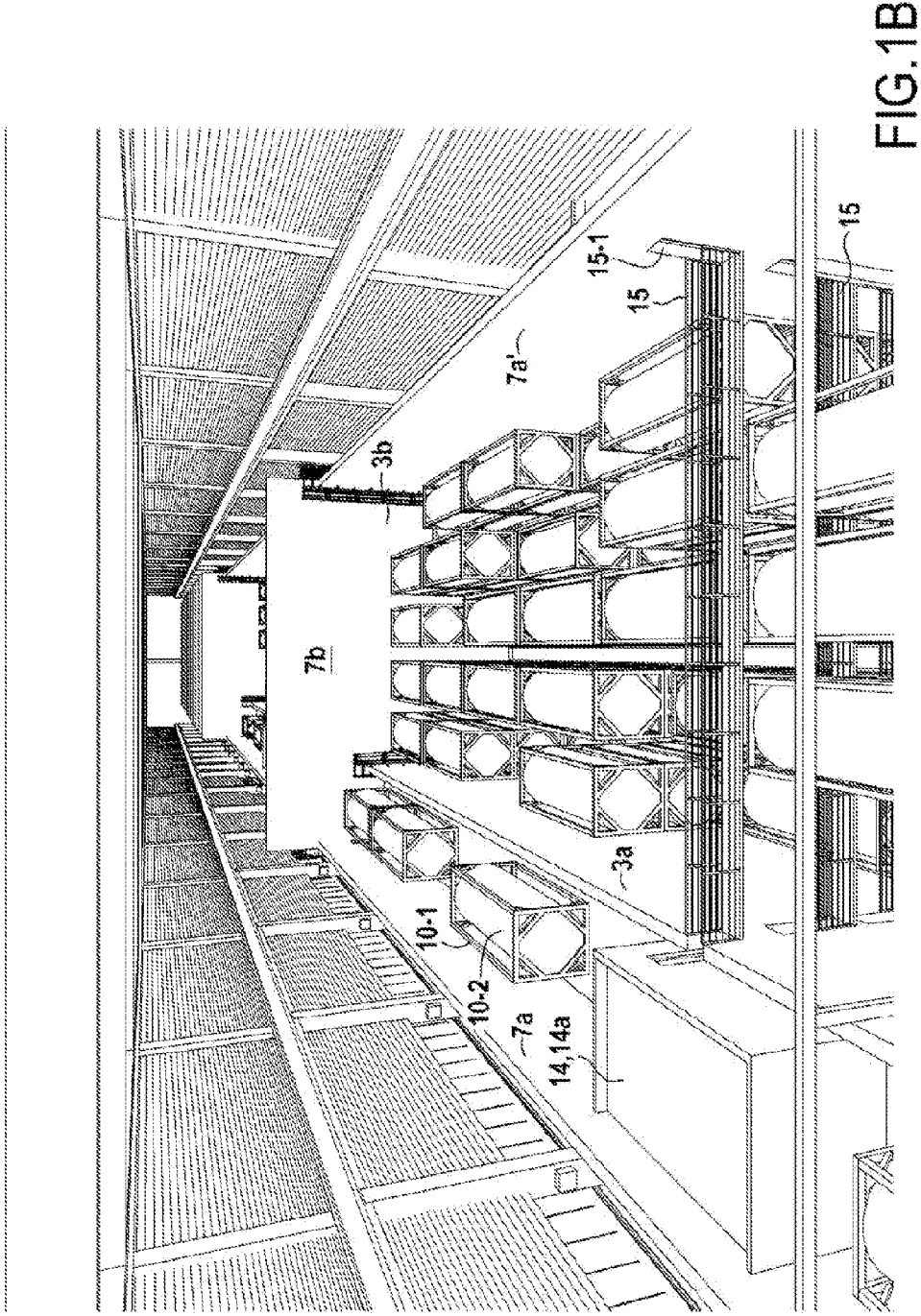

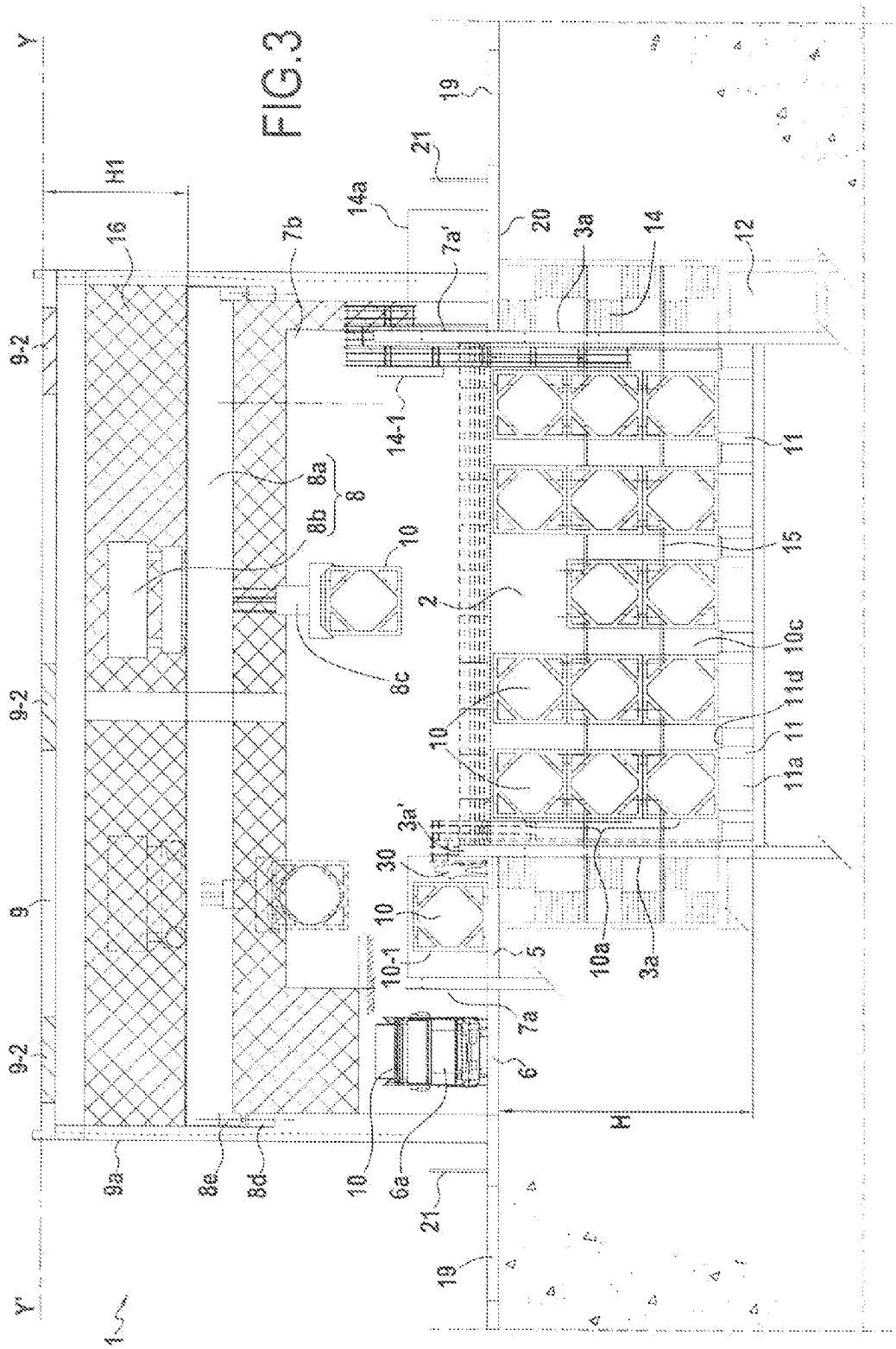

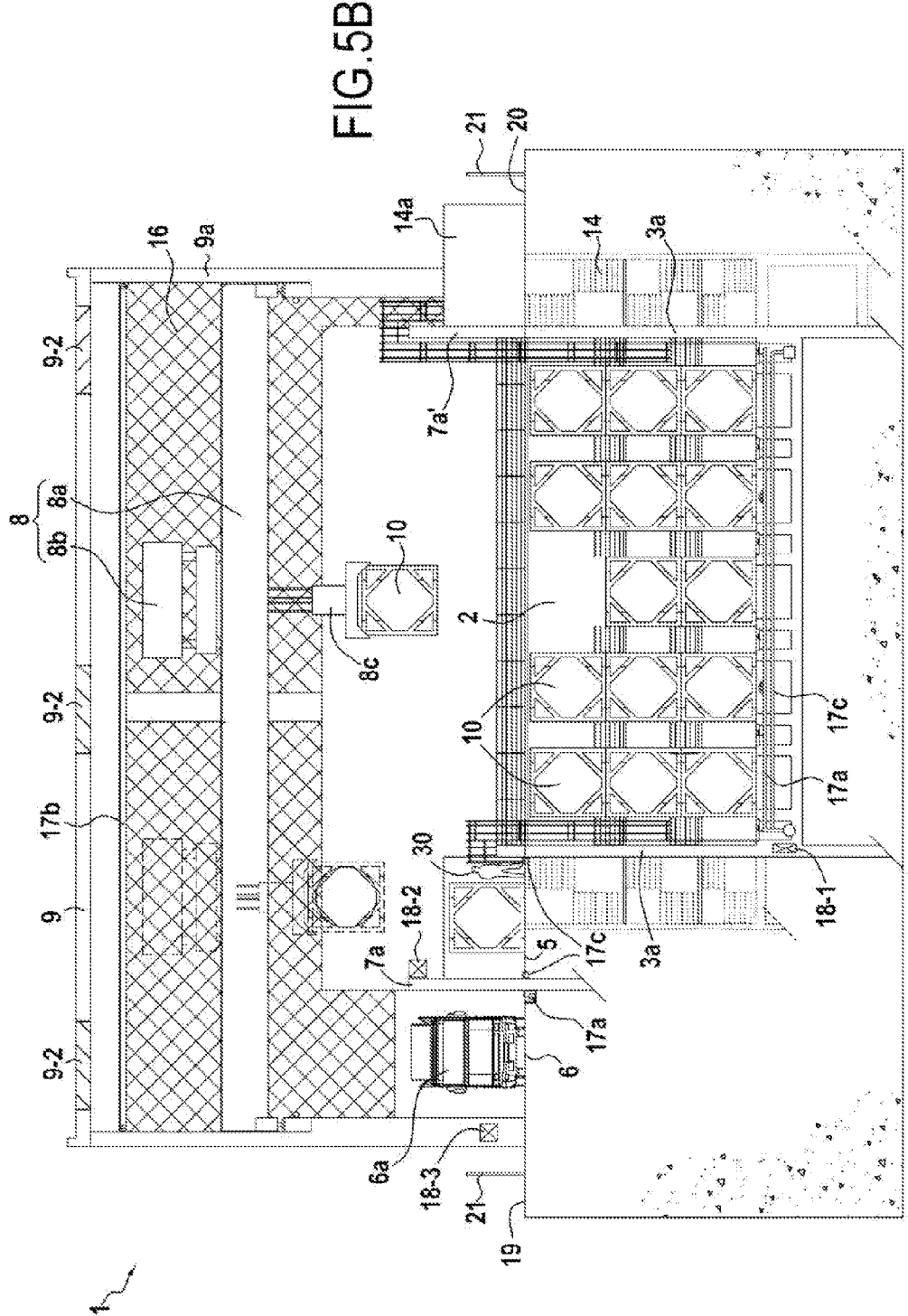

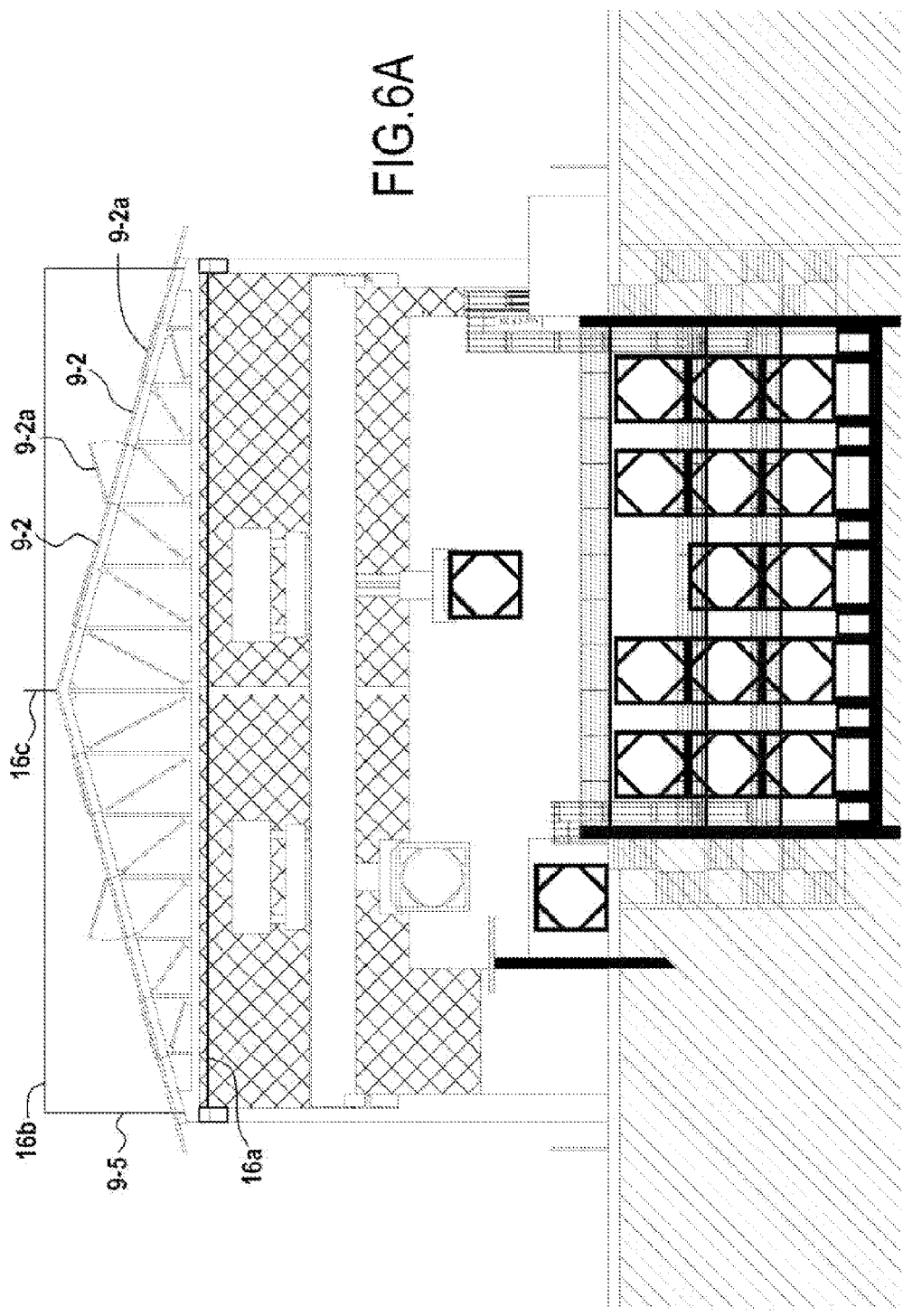

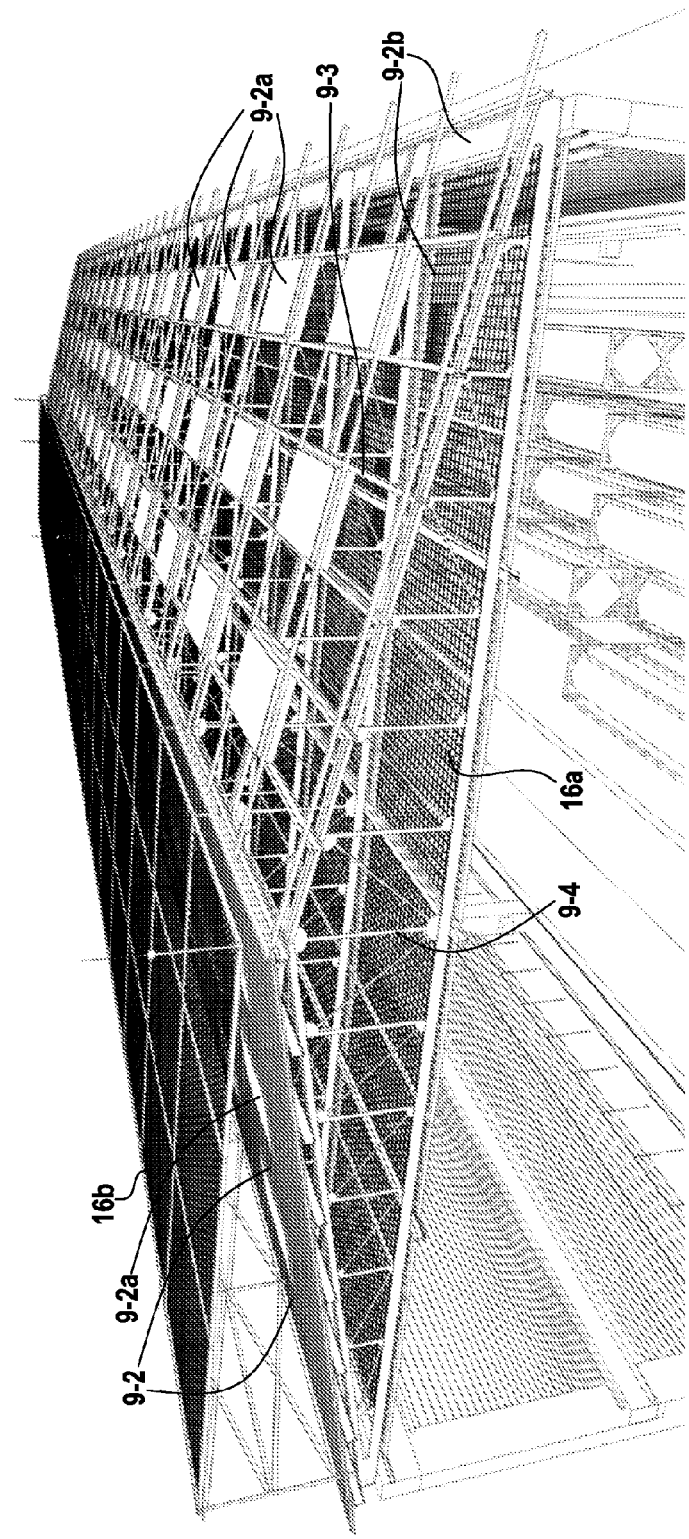

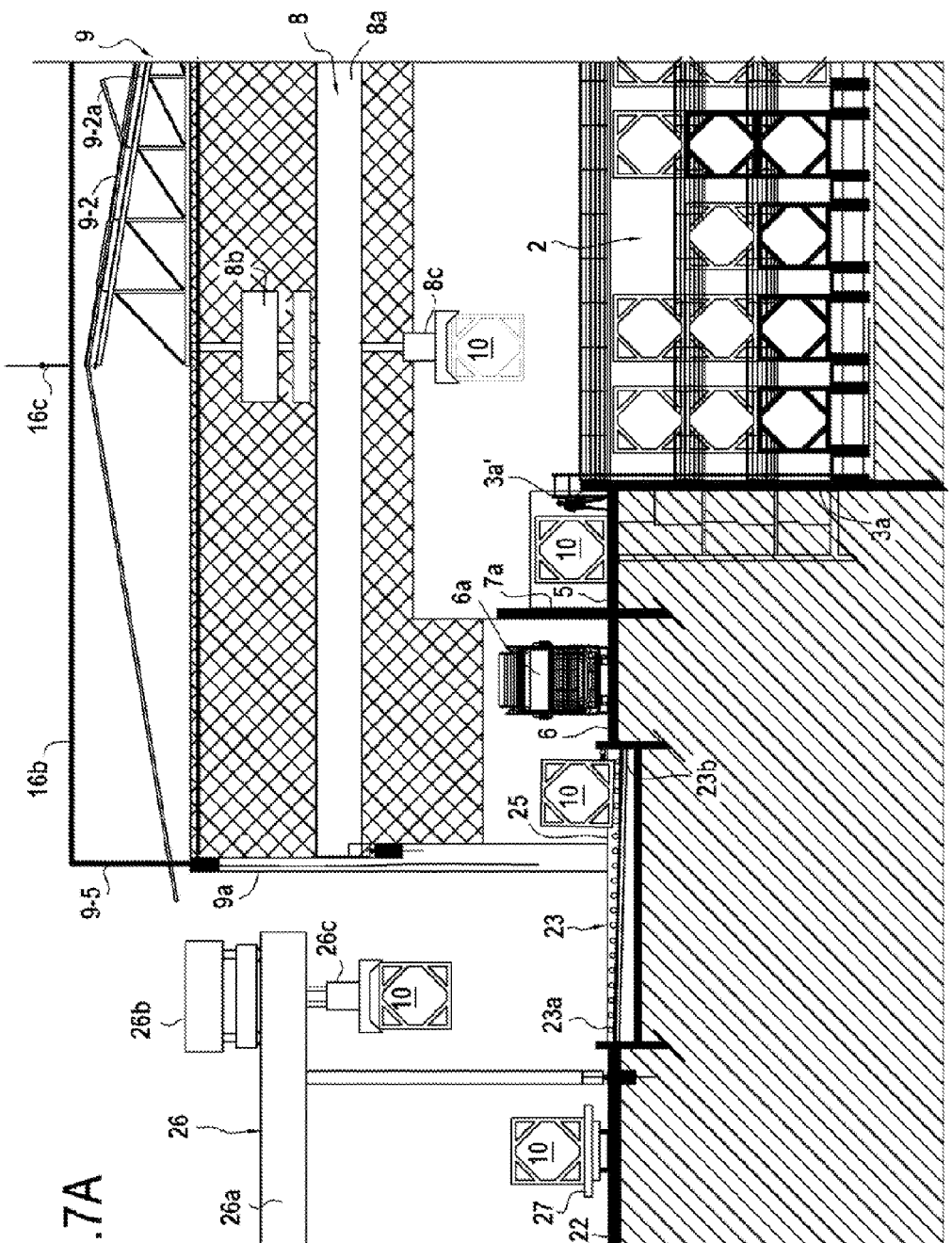

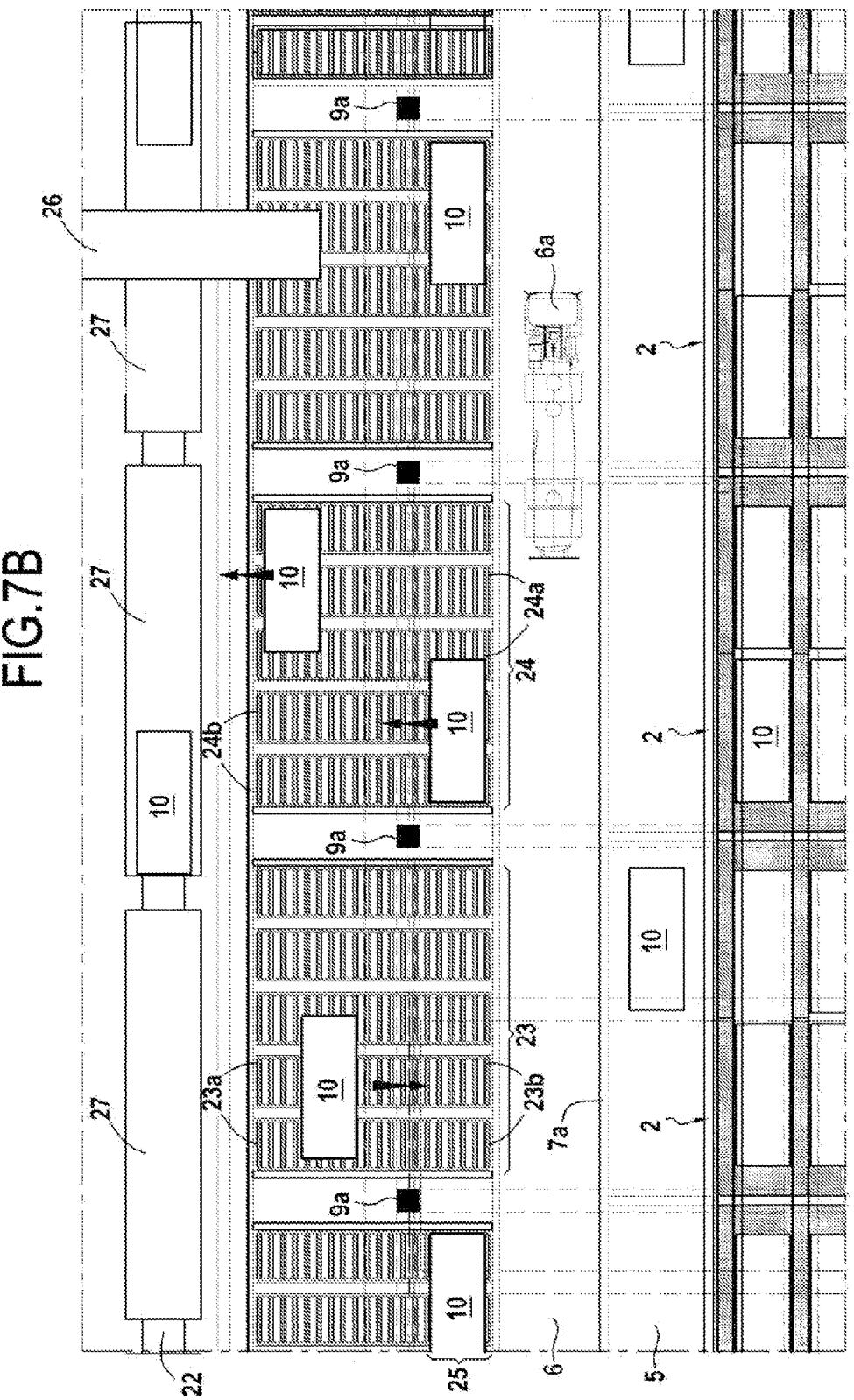

FACILITY AND METHOD FOR STORING DANGEROUS MATERIALS PACKAGED INTO CONTAINERS

This application is a 371 of PCT/FR2010/050582, filed on Mar. 30, 2010, which is incorporated herein by reference.

The present invention concerns a facility and a method for storing dangerous i.e. hazardous materials packaged in containers.

At the current time, hazardous materials packaged in containers do not benefit from proper storage. The problem arises both at production and/or consumption sites of hazardous materials, which only very rarely are provided with nearby sites designed and authorized for storing containers of hazardous materials, but also and in particular for the depositing of containers of hazardous materials in transit notably on multimodal logistic platforms where there is a changeover of transport mode via rail, road or river and at ports, since hazardous materials are not allowed to be deposited thereat for more than 48 hours or for 72 hours in port areas.

Yet possible delays in arrival and departure times for ships in ports, the uncertainties related to rail or river transport mean that the management of transiting hazardous materials is highly difficult, whether on multimodal logistic platforms or in port areas.

It is therefore known, in particular from patent application FR 2653 812 A1, to provide a modular warehouse for hazardous chemical products that is formed of a combination of modular cells which can be juxtaposed, are thermally insulated, impervious to liquids and gases, and fire and explosion proof, made in prefabricated parts that can be dismantled or in traditional masonry work with no metal framework.

However, said modular warehouses intended to be placed in hangars or to be covered with a layer of earth have the disadvantage of being unsuitable for storing some hazardous materials in that they do not meet all safety measures in force for storing such hazardous materials.

The facility for storing hazardous materials in containers according to the invention provides a solution to these transit and storage problems in the safest manner possible.

In particular, the facility must be able to avoid or solve the following problems:
  avoid any direct contact between an ignition source and the stored hazardous materials;
  avoid contact between two non-compatible hazardous materials;
  avoid environmental pollution subsequent to a spill in the installation, and
  prevent outbreaks of fire and, in the event of an accident, fire or explosion, prevent propagation of damage to outside the boundaries of the installation.

For this purpose, the present invention provides a semi-buried storage facility for hazardous materials packaged in containers, comprising:
  at least one cell extending in a longitudinal direction XX', preferably at least three buried cells arranged side by side in the longitudinal direction XX' and delimited by buried, vertical firewalls forming a pit containing the said containers containing hazardous materials of different categories, and
  the or each cell being surrounded by an enclosure comprising vertical firewalls extending above the ground, and
  at least one area for depositing and receiving containers such as a truck roadway and/or an area for handling containers destined for or arriving from a rail transport line, the or each depositing and receiving area extending in the said longitudinal direction XX' outside a longitudinal enclosure wall over at least the entire length of the cell(s), and
  a corridor-shaped depositing strip inside each said enclosure extending in a longitudinal direction XX' between the or each said buried cell and said longitudinal enclosure wall, and
  a motorized container-handling gantry capable of moving a said container notably hung from a grappler frame equipped with four rotating locks and/or four legs or grippers, horizontally from the or each depositing and receiving area towards a said cell in a transverse direction YY' at a height greater than the height of the said enclosure walls, and vertically down to the bottom of each said cell, the said gantry able to be moved in the longitudinal direction XX' overhead the said enclosure walls.

The end purpose of a storage facility according to the invention is essentially to store hazardous materials packaged in containers of ITU type of length varying from 3 to 15 m (more precisely from 10 to 45 feet) and preferably 6 to 12 m (more precisely from 20 to 40 feet) and authorized to be transported by road and rail with the exception of dangerous goods of class 1 (explosive materials), class 6.2 goods (infectious substances) and class 7 (radioactive materials).

By "firewall" is meant herein a concrete shield preventing the propagation of fire either side of the wall, for a minimum time of 2 hours.

By "depositing and receiving area" is meant herein an area in which containers can be deposited or received either directly inside this area or indirectly on a transportation element (e.g. a truck) travelling in this depositing or receiving area.

In practice, the height of the longitudinal enclosure walls is equal to the standard height of a container-carrying truck i.e. at least 4 m above the roadway, and the height of the transverse enclosure walls is at least equal to the height of the longitudinal enclosure walls plus the height of a so-called "High cube" container i.e. at least 7 m.

In one preferred embodiment, the facility further comprises roofing. This roofing advantageously comprises a covering which comprises or cooperates with means preventing objects from passing through the roofing which are more than 0.1 m$^2$ in size preferably objects of size greater than 100 cm$^2$, and which comprises or cooperates with means for evacuating air through the roofing in the event of over-pressure on the underside of the roofing, said roofing being supported by posts preferably outside the enclosure, said roofing covering at least said enclosure and said gantry and preferably the or each depositing or receiving area, and the space between the upper end of the enclosure walls and the said roofing not impeding the circulation of air between the inside and outside of the facility within the said space.

Said roofing is particularly advantageous for protecting the facility against bad weather and from objects likely to deteriorate the containers, whilst providing circulation of air which is indispensable when storing hazardous materials.

In one particular embodiment, the said roofing comprises a weatherproof cladding, comprising regions called over-pressure regions capable of opening in the event of over-pressure on the underside of the roofing, the said roofing further comprising roof wire netting, mesh or grating on the underside of the roof and above the roof and/or above the roof at least in front of the said over-pressure regions, preferably said wire nets, mesh or grating on the underside of the roofing covering the entire said enclosure, and second said wire nets, mesh or grating above the said roofing covering the entire said roofing.

The said roof wire nets, mesh or grating on the topside and underside of the roof are intended to prevent the outward projection of container fragments originating from the said enclosure, and the possible expelling of a roof element which subsequently falls outside the said enclosure as prevented by the wire nets, mesh or grating on the topside of the roof, and optionally which may fall inside the said enclosure as prevented by the wire nets, mesh or grating on the underside of said roofing. The wire nets, mesh or grating on the underside of the roofing also protect the roof against flying container fragments or various other objects originating from the enclosure in the event of an explosion inside the enclosure.

More particularly, the said roofing comprises a framework of metal beams, preferably flame-proofed, further preferably sprayed with a "2-hour" firebreak coating such as flame-retardant mineral wool, said framework carrying a closed cladding formed of panels in steel and/or in fire-resistant composite material, preferably panels incorporating a fire-resistant material such as mineral wool, in particular rock wool confined between two sheets of steel, some of said panels called "pressure relief" panels being capable of opening or rupturing on and after a given overpressure value between the underside of the roofing and the outside above the roof, in particular an overpressure threshold value of 5 to 50 millibars, preferably 10 to 25 millibars, preferably the other said panels of the cladding being capable of individually detaching themselves from the roof framework on which they are mounted, but only on and after an overpressure value higher than said overpressure threshold value for the opening or rupturing of the said pressure relief panels, in particular in the event of explosion inside the facility. This allows the avoiding of damage to the roof framework in the event that the opening and/or rupture of the pressure relief panels are insufficient for such occurrences.

More particularly, the pressure relief panels may be capable of opening by pivoting around hinges, or they may be mounted on fixed frames and able to rupture in either case on and after a said given overpressure threshold value. This cladding of panels in steel and/or composite materials is relatively more lightweight than a standard roof in concrete and/or tiles. The said panels in steel or composite materials are able to detach themselves individually from the framework without the entire framework being projected should the opening and/or rupture of the said pressure relief panels be insufficient to evacuate sufficient air sufficiently quickly to preserve the roof. The roofing may comprise these two types of pressure relief panels.

In one variant of embodiment the lightweight, weather-proof cladding may be eliminated and even the framework as well, so as only to maintain the said wire nets, mesh or grating supported by the said posts to prevent the outward projection of container fragments or other objects originating from the enclosure in the event of an explosion, whilst allowing the free passing of air through the roofing.

The different characteristics of the facility contribute towards providing a safe installation for storing hazardous materials.

More particularly, the following technical effects are obtained:
- the buried nature of the cells allows any explosion occurring inside a cell to be prevented from propagating to outside the facility,
- the enclosure firewalls prevent an explosion or fire outside the facility from propagating into a cell and, conversely also contribute towards preventing the propagation of fire or explosion initiated by the stored hazardous materials from propagating from a cell towards the outside of the facility,
- the 4 m height of the enclosure walls corresponds to a standard height of container-handling trucks carrying a container, and takes into account the heights of different civil engineering structures such as bridges and tunnels on public roads and highways.
- the transverse walls, including at the ends of each cell, form a separation firstly between cells and secondly between the outside and the cells located at the end parts of the storage. The fact that they are higher means that it is possible to make the facility even safer by preventing any propagation of a fire or explosion from one cell to another. These separating transverse walls of greater height therefore isolate the cells from each other in the event of an incident, in particular an incident propagating to a container hung from a height during handling i.e. overhead and at a height higher than that of the longitudinal separating walls.
- the structure and arrangement of the depositing areas and handling gantries contribute towards the safety of the facility by minimizing container handling times between the delivery truck and a cell. A loaded truck and an empty gantry come to position themselves at a predetermined point in the longitudinal direction of the corridor, which means that there only remains a short distance in the transverse direction over which the gantry needs to travel.
- the longitudinal enclosure wall between the roadway and the depositing area avoids trucks having to enter inside the storage enclosure.
- the depositing strip allows a container to be deposited after unloading from a truck before it is taken up by the gantry, but it is also used when a container is to be removed from a cell this container lying underneath others in the same column (in which case the containers lying above the container to be removed are momentarily deposited in the depositing area),
- the fact that the depositing strip is located inside the said enclosure means that the travel distance for the gantry is limited, but this also provides additional safety in the event of explosion or fire at truck level on the roadway, and vice-versa protects a truck in the event of fire inside the enclosure,
- the open space between the roofing and the upper ends of the enclosure walls, which promotes proper ventilation inside the storage facility, combined with the choice of weather-proof but lightweight roofing that easily deforms in the event of air overpressure underneath the roofing, limit destruction to the building in the event of over-pressure caused by an explosion. Similarly, the fact that the cell walls are buried also provides a safeguard against destruction to the building in the event of an incident involving major blasts.

More particularly, in the storage facility according to the invention:
- each cell open on the topside is laterally delimited by four buried, vertical firewalls resting on a floor, preferably a floor with slightly sloped base but equipped with supports allowing the horizontal storage of containers, the four vertical walls comprising two longitudinal cell walls extending parallel in a longitudinal direction XX' and two transverse cell walls extending parallel in a transverse direction YY' perpendicular to the longitudinal direction XX' between the two longitudinal cell walls, and each said enclosure comprises four vertical firewalls, comprising two longitudinal enclosure walls extending over a height of at least 4 m above the ground in parallel and in a longitudinal direction XX', and two transverse enclosure walls extending parallel in a transverse direction YY' perpendicular to the longitudinal direction XX' between the two longitudinal enclosure walls, the two transverse enclosure walls being of greater height than the longitudinal enclosure walls preferably at least 7 m in height, and the or each depositing and receiving area extends in the said longitudinal direction XX' outside a first or first longitudinal enclosure walls over at least the entire length of the cell(s), and the said corridor-shaped depositing strip inside each said enclosure extends in a longitudinal direction XX' between each said buried cell and said longitudinal enclosure wall, and the said motor-driven container handling gantry is capable of moving a said container, hung from said first carriage, horizontally along the said beam in the said transverse direction YY' at a greater height than the height of the said longitudinal enclosure wall, preferably at a height lower than the height of the said transverse enclosure walls, then vertically down to the bottom of a said cell onto a said floor, and the said beam cooperates with second longitudinal guiding means such as rails or a slide and with second carriages capable of moving the said beam along said second guiding means above the said transverse enclosure walls in the longitudinal direction XX'.

In this particular case, the roofing is advantageously located at a height H1 above the upper end of the said transverse enclosure walls, H1 to allow the longitudinal movement of the said unloaded gantry above the said transverse walls and the transverse movement of a said container hung from the said gantry above the said longitudinal enclosure walls, but preventing the longitudinal movement of a said container hung from the said gantry above the said transverse walls.

Still further particularly, each said cell comprises several said successive cells in the longitudinal direction XX' of same width in the said transverse direction YY', and two successive adjacent cells have a common said transverse enclosure wall of greater height, and the said longitudinal enclosure walls of the different cells form on each side one same longitudinal enclosure wall continuous over the entire length of the facility, the second longitudinal enclosure wall located on the side opposite the side of the said depositing strip extends in the height-wise continuity of the second buried longitudinal cell walls, and form one same longitudinal enclosure wall therewith, and the said transverse enclosure walls extend in the height-wise continuity of the said transverse cell walls and form one same wall therewith.

It will be understood that two successive adjacent cells therefore also have one same transverse cell wall in common.

In one preferred embodiment, each said cell comprises containers of parallelepiped type known as Intermodal Transport Units (ITUs) of standard size, the said containers being stacked in columns of three containers, the said columns being aligned in rows of columns in the longitudinal direction, preferably each row in the longitudinal direction XX' comprising 5 to 25 said columns per row, preferably 10 to 16 columns of containers 20-feet in length (6.058 m) per row, and each cell comprising 3 to 7 rows, preferably 5 rows of said columns arranged parallel in the transverse direction YY', leaving free throughways between each said row.

Intermodal Transport Units (ITUs) are either enclosed containers with metal walls (in particular ISO standard containers of so-called "Dry" type or "stackable swap bodies" or parallelepiped frames carrying a cylindrical tank with metal wall, or non-stackable swap bodies whose maximum outer dimensions are: length 13.6 meters, width 2.55 meters. The number of three containers, in particular three intermodal transport units, in each column is compatible with the mechanical strength properties of the said containers, in particular of ITUs, and therefore with the load borne by the lowermost intermodal transport unit in the column. For non-stackable swap bodies, some storage areas are equipped with steel frames allowing the stacking thereof without having to bear the weight of those placed above. The maximum number of seven rows and optimal number of five rows is compatible with a reasonable range of the handling gantry in the transverse direction YY' having regard to the mechanical strength of said device. The optimum number of 14 to 16 columns of containers per row allows the storage of 210 to 240 containers (19 to 24 $m^3$ for 20-foot tank containers, 33 $m^3$ for 20-feet ISO standard containers) per cell, which represents a maximum storage surface area per cell of the order of 2500 $m^2$, on the understanding that the regulatory limit for a storage surface area generally applied to a storage cell is 4000 $m^2$.

More particularly, at least one said cell, preferably each cell, comprises channelling means such as slopes and drainage channels capable of directing effluent, such as drippings or waste originating from said containers, from the floor of the bottom of the cell towards a large retention tank whose volume is at least equal to that of a container, the said large retention tank being offset outside the cell, preferably buried and preferably provided with an automatic shut-off device.

This large retention tank located outside the cell prevents the formation of a sheet of flammable hazardous material underneath the containers inside a cell. Also, its location outside the cell provides an additional safeguard.

Further preferably in a facility according to the invention, the bottom of each cell is partitioned by dwarf supporting walls, preferably longitudinal dwarf walls parallel to each other and rising above a floor, each container at the bottom of a cell or said column of containers resting on two said dwarf supporting walls delimiting effluent containments underneath the said container or column of containers, and the said floor is slightly sloped preferably with a double-slope converging towards the centre of the length of the cell where a sloped transverse drainage channel directs the effluent from the said containments towards a large retention tank outside the cell that is preferably buried and further preferably arranged at mid-length of the cell.

Preferably at least one said cell comprises at least one column of containers called "effluent containers" preferably two columns of three containers intended to receive effluent, said effluent having initially escaped from full containers of hazardous material towards the bottom floor of the cell then preferably directed towards a large retention tank located outside the cell and preferably buried.

These effluent containers can be handled by the handling gantry. The liquid pumped into an effluent container can be sampled by an operator for analysis. Should analysis detect any kind of pollution, the collected effluent is dispatched to a treatment centre to be destroyed.

As a variant, the "effluent container" column or columns can be specifically confined by transverse firewalls so that they lie fully outside the actual storage cell, and can even be positioned on the outside in the longitudinal continuation of the said storage enclosure in a specific confinement area within the operational range of the gantry.

More particularly the said effluent containers collect the effluent retained in the said large retention tank after being conveyed in channels between the said large retention tank and the said effluent containers via pumping means installed outside the cell, preferably the filling of the said effluent container or containers being automatically triggered when the said large retention tank is filled to a certain level.

The installation of the pumping means outside the firewall enclosure also provides an additional safeguard, as does the confining of the "effluent containers" by transverse walls of greater height than the longitudinal enclosure walls, preferably at least 7 m in height.

Further advantageously, said cell comprises at least one enclosed stairway buried outside the cell giving access to the height of each effluent container in a column of effluent containers, preferably via footbridges for inspection of the effluent containers.

The arrangement of said inspection stairway outside the cell separating wall provides for operator safety, allowing inspection of the content of a container in particular for sampling or optionally for disconnection thereof.

Preferably the columns of effluent containers are arranged at mid-length of the cell, and the said large retention tank and the said stairway are arranged one under the other also at mid-length of the cell to minimize distances for effluent transport.

Preferably, at least one cell is partitioned by inner transverse partitions of same height as the said longitudinal cell walls, so as to delimit sub-cells isolated from one another inside the said cell.

Such inner partitioning is particularly useful for some categories of hazardous materials explained below, which require increased isolation. Preferably these inner transverse partitions also have firewall properties.

According to another advantageous characteristic of the present invention, the said facility comprises second outer wire mesh or netting to protect against flying debris, extending vertically from the edges of the said roofing down to below the upper end of the said longitudinal enclosure walls and the said transverse enclosure walls and preferably not extending to more than 2 m below the level of the ground of the or of each depositing and receiving area, the roadway in particular.

These anti-debris nets or meshes are intended to prevent flying fragments originating from an explosion inside the storage enclosure from being expelled to outside the facility, and preferably the mesh size of the protective wire netting is less than 100 cm$^2$. Advantageously whilst allowing air to pass in the event of a blast or detonation, this anti-debris mesh or netting is secured to the posts supporting the roofing.

In one preferred embodiment, additional protective netting which can be deployed on command can be deployed from the roofing at the upper end of the said transverse cell walls, of one of said cells of one same installation. This secondary deployable netting or mesh contributes towards preventing the propagation of an incident between adjacent cells. This secondary netting is of smaller mesh size than the outer protective netting. This secondary netting is attached to the underside of the roofing above each transverse firewall separating the cells, and is weighted so that it falls along the firewalls. Its deployment can be triggered automatically in the event of an incident, or manually.

In one advantageous embodiment, some cells may further comprise additional transverse partitions partitioning said cell transversally, these transverse partitions of each cell possibly being combined with additional nets attached to the surface of the roofing directly above each transverse partition outside the said cell.

According to another advantageous characteristic of the present invention, the storage facility further comprises:
  detection means, notably laser, to detect leaks of products contained in containers on the floor of a said cell, and
  fire and explosion detection means, notably infrared means, inside a said cell, and
  means for injecting pressurized water in the form of vertical curtains of water around the periphery of said cell and preferably also at the bottom of the cells creating a surround of vertical water curtains around each column of containers, and means for injecting fire-fighting foam at the bottom of a cell and preferably on the said depositing strip, and
  devices to earth all the containers, and a lightning conductor ensuring protection of the storage installation against lightning strikes.

This device for injecting pressurized water to create a curtain of water surrounding said cell forms a protection by limiting emissions of gases and vapours towards the outside, and also ensures cooling of the anti-debris protective wire mesh or netting.

The injection of foam is intended to cover any flammable or ignited spills at the bottom of the cells in the outbreak of fire.

These water injection devices entail a pipe network extending from the underside of the roofing and/or bottom of the cells, the drainage channel located at the bottom of the cells collecting the deluge water and directing it towards the said large retention tank or to the pump sump if the cell concerned does not have a so-called offset large retention tank.

The storage facility of the invention typically has the following overall dimensions:
  total length 100 to 500 m, more particularly 150 to 350 m, and
  total width 25 to 100, more particularly 30 to 80 m.

A further subject of the present invention is therefore a method for storing hazardous materials which comprises the following steps:

1) a container is brought to the or to each depositing and receiving area as far as a cell intended to receive the category of hazardous materials contained in the container to be stored, in particular by moving a container delivery truck along the roadway or by moving a container delivery wagon along the rail transport line and conveying the container from the wagon to the handling area, the containers being positioned in the different cells in relation to the type and/or class of hazardous material contained in the container, 2) a said container is moved from the depositing and receiving area to the depositing strip by means of a said handling gantry, in particular by moving the container from the truck travelling on the said roadway or by moving the container taken from the rail wagon from the handling area, and 3) a said container is moved from said depositing strip to inside the said cell by means of the said handling gantry, the containers being laid on supporting dwarf walls at the bottom of the cell or on the top of a column of containers comprising one or two stacked containers.

Other characteristics and advantages of the present invention will become apparent in the light of the detailed description of one illustrative embodiment given below with reference to the following figures:

FIGS. 1A and 1B are perspective views of the inside of a facility according to the invention;

Figure 2A:
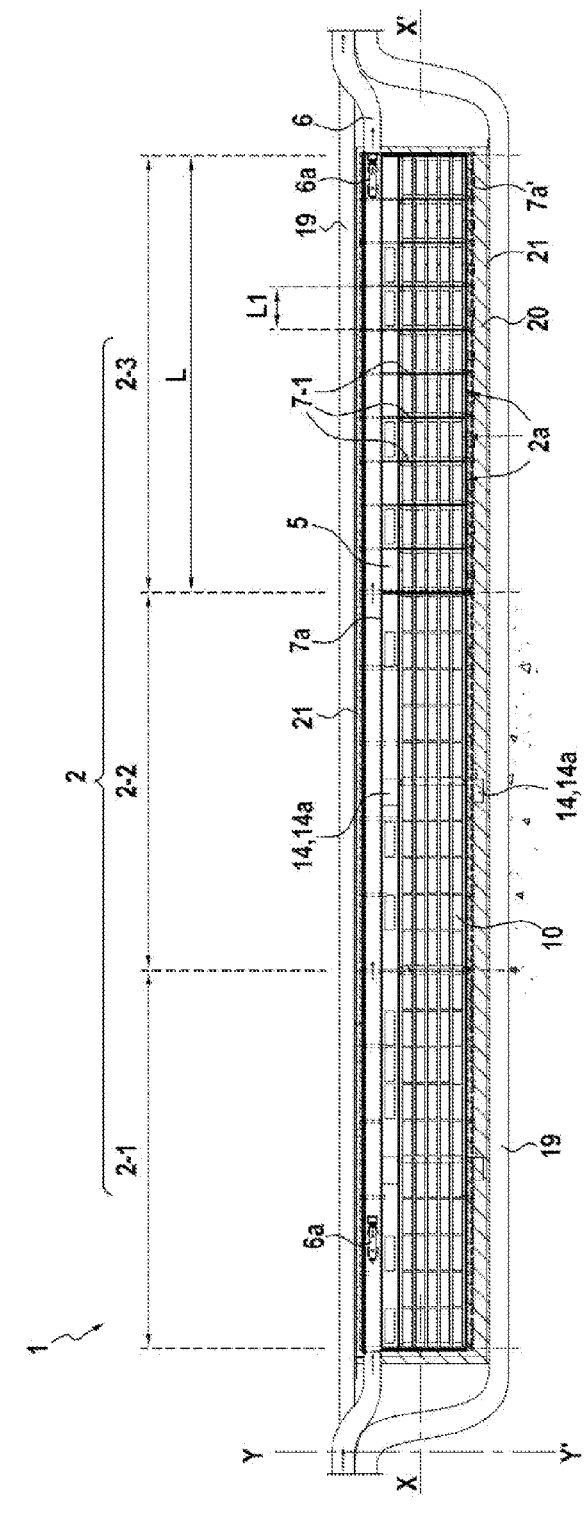
Figure 2B:
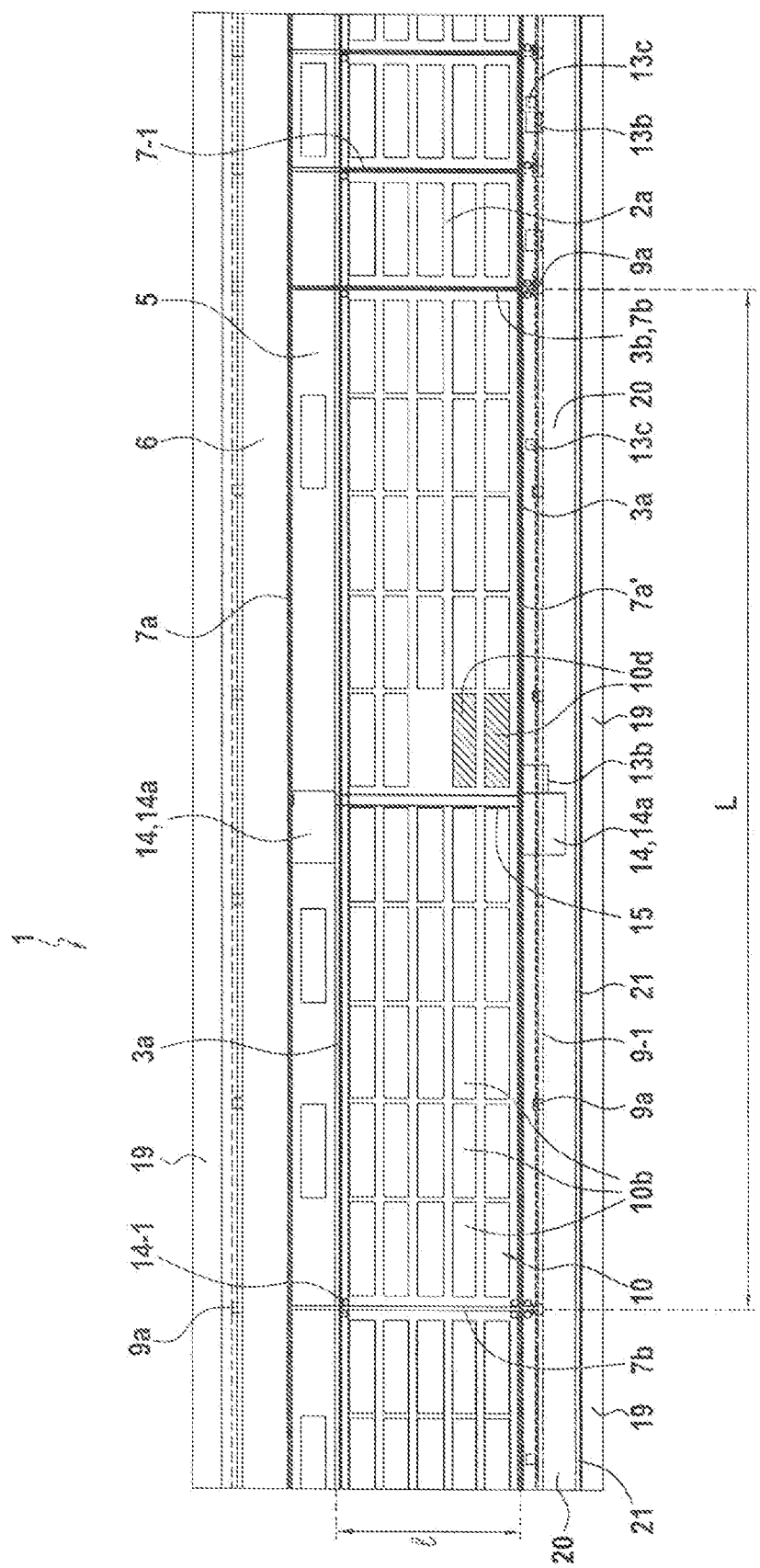
Figure 2C:
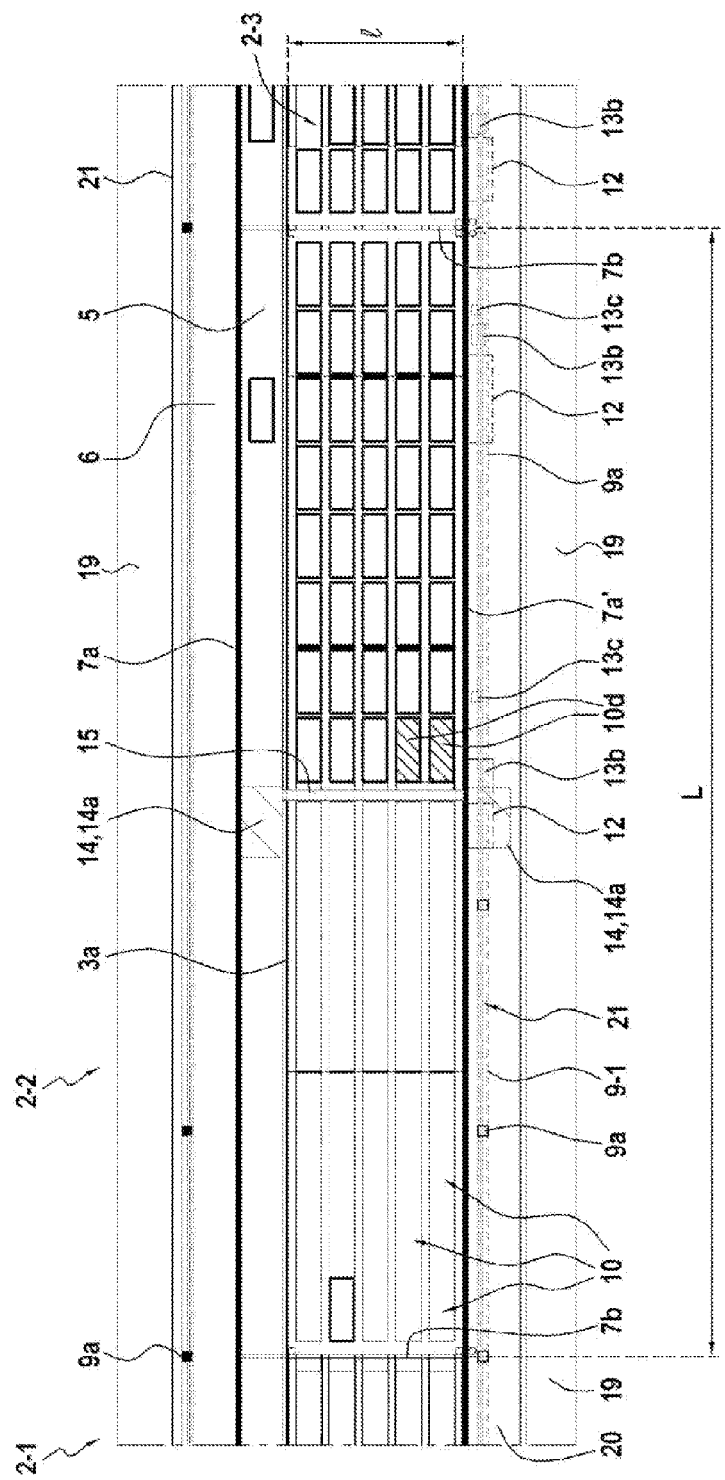
Figure 4A:
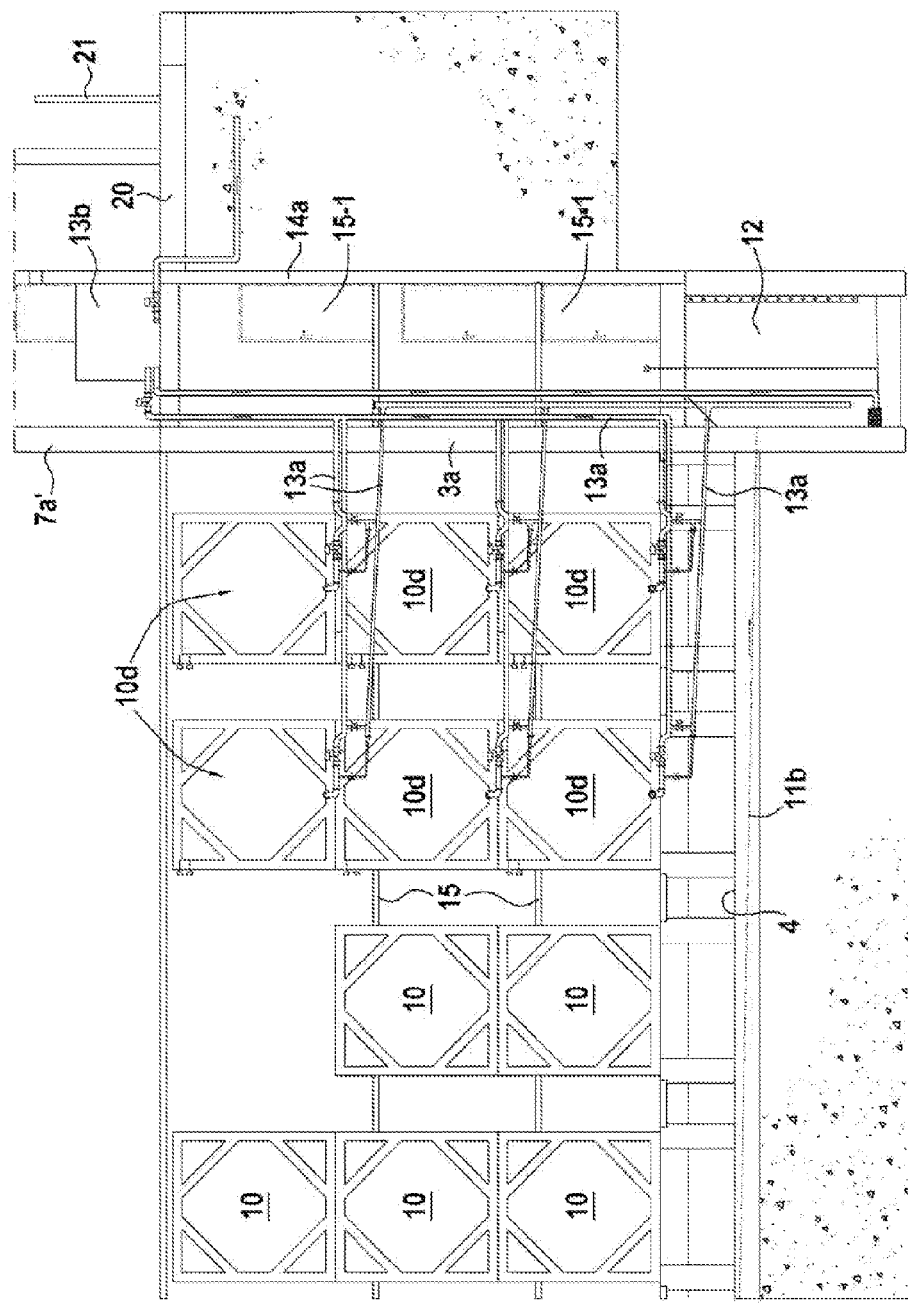
Figure 4B:
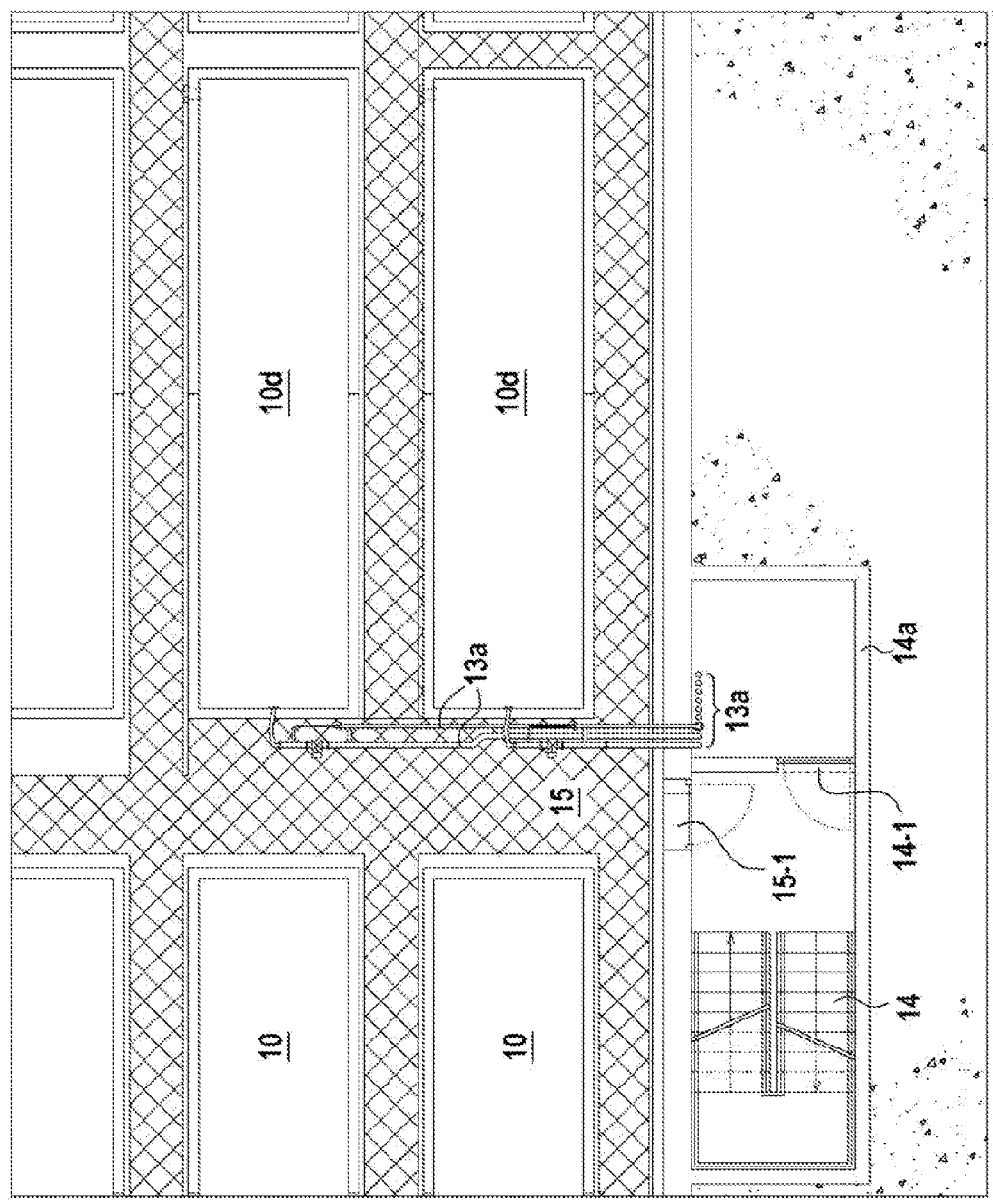
Figure 5A:
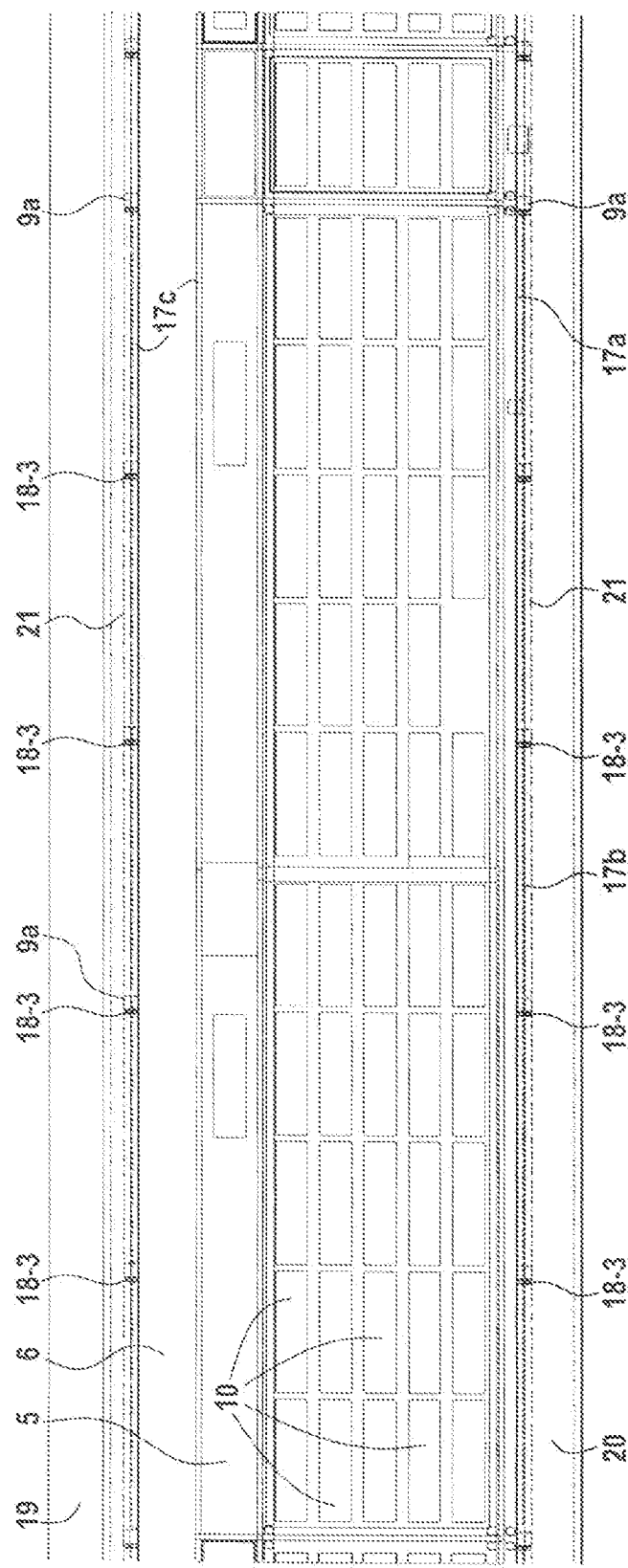

FIGS. 2A and 2B are overhead views of the inside of a facility according to the invention, with cells able to contain 5 rows of 14 to 16 columns of 3 containers stacked on each other, the containers chiefly being 20-foot containers i.e. a maximum total content of 240 20-foot containers per cell, or 210 containers divided into 180 20-foot containers and 30 30-foot containers;

FIG. 2C is a variant of FIG. 2B with 20-foot containers, each cell able to contain 5 rows of 16 columns of 3 containers, i.e. 240 containers;

FIG. 3 is a cross-sectional view of a facility according to the invention;

FIGS. 4A and 4B are a cross-sectional and overhead view of a facility according to the invention at the effluent containers;

FIGS. 5A and 5B are an overhead view (FIG. 5A) and cross-sectional view (FIG. 5B) of injection circuits for injecting pressurized water and foam in and around the facility according to the invention;

FIGS. 6A to 6B are a cross-sectional view (FIG. 6A) and perspective view (FIG. 6B) of roofing of a facility according to the invention having two sides equipped with pressure relief panels and with said first and second anti-debris wire netting or mesh. FIG. 6B illustrates said second anti-debris wire netting or mesh 16b solely on the left slope of the roofing, to better illustrate the pressure relief panels 9-2a;

FIG. 7A is a cross-sectional view of a facility according to the invention in which a rail transport line is provided together with gravity conveying devices between the rail transport line and the storage handling gantry, and FIG. 7B is a partial overhead view of the facility illustrated in FIG. 7A.

The standard, semi-buried storage facility 1 according to the invention comprises three buried cells 2-1, 2-2, 2-3 each containing hazardous materials compatible with each other, on the understanding that it is prohibited to store products which may react with each other in one same cell.

The three cells respectively extend in a longitudinal direction XX' and are arranged consecutively in adjacent manner in this longitudinal direction XX' of the facility. Each cell forms a pit delimited by four buried, vertical side walls 3a, 3b resting on a bottom floor 4, namely two longitudinal cell walls 3a extending parallel to one another in the longitudinal direction XX', and two transverse cell walls 3b arranged at each longitudinal end of the cell and extending parallel to one another in a transverse direction YY', perpendicular to the longitudinal direction XX' ensuring the junction between the two longitudinal walls 3a of each cell.

Figure 1:
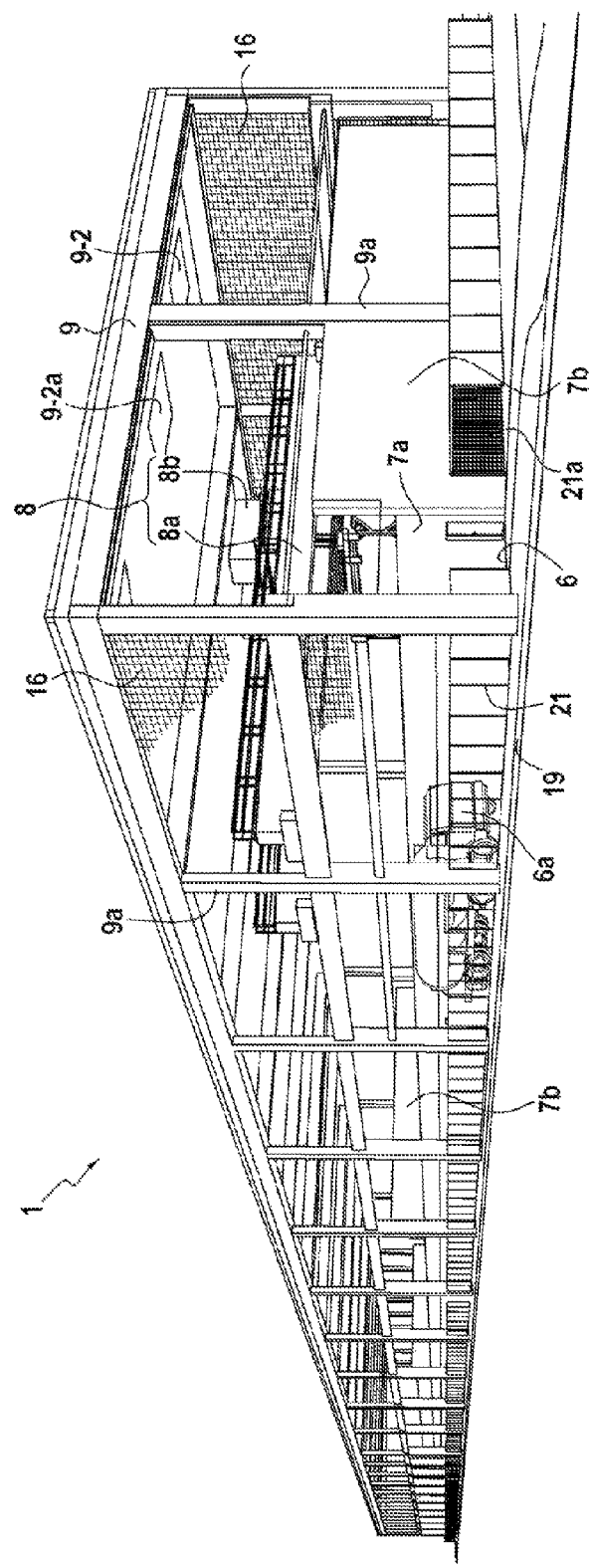
FIG. 1 is a perspective view of a facility according to the invention, from one of its gables at a longitudinal end.

The different longitudinal cell walls 3a are arranged in a line and in fact form one same longitudinal buried wall on each side of the cells, as illustrated in particular in FIGS. 1A, 4A and 5B.

Depending on the choice of site for the facility, the type of natural soil may vary. For example, in so-called wet sites one or more underground water tables may lie relatively close to the surface of the ground. Therefore, depending upon the type of natural soil in which the cells 2 and their respective walls 3a, 3b are buried, the depth at which these are buried may vary; in other words the cell walls 3a, 3b are buried to a greater or lesser depth in this natural soil.

For wet sites in particular, the walls 3a, 3b have upper parts projecting above the natural soil surface, in other words above-ground upper parts. As a result, these upper parts of the walls 3a, 3b above natural ground level are surrounded on their outer periphery by a layer of added material such as backfilling material; the layer of added material being of sufficient height and thickness so that the pit-forming cells 2 are fully encased both by natural ground and by the peripheral layer of added material.

In the examples illustrated in the figures, the transverse cell walls 3b of two adjacent cells form one same single, buried, transverse cell wall 3b.

The group of three cells consecutively arranged in the longitudinal direction XX' is surmounted and surrounded by an enclosure formed of two longitudinal enclosure walls 7a, 7a'.

A first longitudinal enclosure wall 7a is located beyond the first buried, longitudinal cell wall 3a-3a' at a sufficient distance so as to form or delimit a rectilinear, longitudinal depositing strip 5 between this first longitudinal cell wall 3a and this first longitudinal enclosure wall 7a.

The said first buried longitudinal cell wall 3a is surmounted by a dwarf wall 3a' preventing a container 10 deposited on the depositing strip 5 from falling into the bottom of the cell under consideration.

A second longitudinal enclosure wall 7a' is arranged above a second longitudinal cell wall 3a. In other words, this second longitudinal enclosure wall 7a' extends in the continuity of the second longitudinal cell wall 3a, and these two walls 7a' and 3a advantageously form one same single wall as can be seen in particular in FIGS. 1A, 3 and 4A.

The longitudinal enclosure walls 7a, 7a' are "2-hour" concrete firewalls (Grade 2H) and extend over a height of 4 m corresponding to the height of a truck 6a transporting a container 10 of standard size described below.

The transverse enclosure walls 7b, at each longitudinal end of the enclosure surrounding all the cells, extend over a height of 7 m above the depositing strip 5.

A roadway 6 for trucks 6a extends in the longitudinal direction XX' on the outer side of the longitudinal enclosure wall 7a delimiting the depositing strip 5 and over the entire length of the three cells. Since the trucks transport containers 10 to or from the cells 2, this roadway 6 evidently forms a depositing and receiving area for containers 10 originating either from trucks 6a, or from cells 2 to be taken to trucks 6a.

A handling gantry 8 called a storage handling gantry 8, that is motorized for handling containers 10 comprises a beam 8a extending in the said transverse direction YY' above the cells, said beam comprising means of groove or slide type to guide a first carriage 8b capable of moving a said container 10, hung by a grappler frame 8c from said first carriage, horizontally along the said beam in the transverse direction YY' at a height greater than the height of said longitudinal enclosure walls 7a, 7a' from a said truck 6a as far as above a said cell, then vertically from a certain height down to a bottom floor 4 of a said cell.

The said beam 8a cooperates with second longitudinal guide rails 8d carried by the posts 9a supporting the roofing 9 above the facility, the said posts 9a being arranged on each side of the facility and aligned in the longitudinal direction XX'.

The second longitudinal guide rails 8d cooperate with second carriages 8e capable of moving the said beam 8a along the said second guide rails above the transverse enclosure walls 7b.

As mentioned above, the transverse enclosure walls 7b are higher than the longitudinal enclosure walls 7a, 7a', so that:

to move the beam 8a in the longitudinal direction XX' above the transverse walls 7b, the carriage 8b must not carry any container 10 hung from the grappler frame 8c, and when the first carriage 8b is moved with a container 10 hung from the frame 8c, travelling in the transverse direction YY', the said container 10 hung from the frame 8c does not exceed height-wise the height of the transverse enclosure walls 7b.

Therefore, should an explosion or incident occur at the container 10 hung from the frame 8c, the incident is not able to propagate to an adjacent cell in the longitudinal direction.

The facility comprises lightweight weatherproof roofing 9, carried by posts 9a arranged outside the roadway 6 and outside the longitudinal enclosure wall 7a' at the opposite end of the facility in the transverse direction YY'. The roofing 9 is positioned above the storage handling gantry 8 and said roadway 6. Therefore the storage handling gantry 8 is arranged inside the structure partly defined by the roofing 9 and the posts 9a.

Open spaces, allowing the circulation and evacuation of air between the posts 9a and between the roofing 9 and the upper ends of the longitudinal enclosure walls 7a and 7a', are equipped with protective wire mesh or netting 16 called explosion-protection wire netting known to the person skilled in the art and marketed in particular by GEOBRUGG (Switzerland). This netting extends from the surface of the peripheral edge 9-1 of the roofing 9 down to a height of 2 m above ground level so as not to prevent an operator 30, member of the facility's personnel from leaving the installation underneath the net protection in the event of an incident.

In some figures the wire nets 16 are solely schematized by horizontal lines but they are in fact grid-shaped forming mesh of substantially diamond-shape.

At the longitudinal ends of the facility, two other wire nets or meshes 16 extend from the surface of the lower peripheral edge 9-1 of the roofing 9 to below the upper end of the end transverse enclosure walls 7b, outside the latter.

The width of the roofing 9 covers the roadway 6, the depositing area 5 and the cells 2.

Outside the enclosure, on the side opposite the roadway 6, there is an area forming a technical platform 20 extending along and outside the longitudinal enclosure wall 7a'. This area forming a technical platform 20 receives various technical means which will be described below.

A peripheral access road 19 for fire engines is provided outside the facility on the two sides thereof just beyond fencing 21 comprising different access gates (not illustrated) enclosing the facility between the fire engine access road 19 and the roadway 6 on one side, and the fire engine access road 19 and the technical platform area 20 on the other side, as can be seen in particular in FIG. 3.

Each cell 2, 2-1, 2-2, 2-3 contains containers 10 stacked in columns 10a of three containers, the different columns 10a being arranged in rows 10b each comprising 14 (cell 2-1) to 16 (cells 2-2 and 2-3) columns, a maximum of three containers per column.

The size of the cells and of the ITUs (see below) therefore allows 150 standard 3-foot containers (FIG. 2B) or 240 standard 20-foot containers (FIG. 2c) to be stored.

The ITUs 10 are composed of a parallelepiped frame 10-1 carrying a cylinder 10-2.

The floor 4 of each cell 2 is partitioned by dwarf longitudinal walls 11 parallel to each other and rising above the floor 4. Each column 10a of containers rests on two so-called dwarf longitudinal parallel walls delimiting effluent containments 11a which communicate with each other however. The said floor 4 is sloped having a double slope converging towards the mid-length of the cell where a sloped transverse drainage channel 11b directs the so-called "effluent" products escaping from the stored containers 10 from the said containments 11a towards a large retention tank 12 buried outside the cell and also arranged at mid-length of the cell. The slopes of the cell bottom are of the order of 1.5% and the slope of the drainage channel 11b about 2%.

The cells (2-1, 2-2) comprise two columns 10a of three specific containers intended to receive effluent which has escaped from the other containers, these containers 10d being called "effluent containers".

In fact, these effluent containers 10d are intended to collect the said effluent from the large retention tank 12 via channels 13a installed between the large retention tank 12 and each of the effluent containers 10d, the effluent being circulated in said channels 13a via pumping means 13b arranged in the area forming a technical platform 20 outside the enclosure.

The columns of effluent containers 10d, like the large retention tank 12, are located substantially at mid-length of each cell.

The different effluent containers 10a can be inspected by personnel 30. For this purpose, access footbridges 15 arranged in the transverse direction YY' pass through the cell at three superimposed height levels opposite the effluent containers 10d, to allow access thereto and inspection thereof by personnel 30. To do so, the personnel 30 use stairways 14 arranged outside the longitudinal cell walls 3a, namely at the level of the depositing strip 5 on one side and outside the second longitudinal enclosure wall 7a' on the other side.

These two stairways 14 are each enclosed in a stairwell 14a and provide access via doors 15-1 to the three footbridges 15 giving access to the three levels of containers 10d in the column of containers 10d, from each of the two stairways 14 arranged at the two ends of the footbridges 15a in the transverse direction YY' substantially at mid-length of each of the cells 2-1 and 2-2.

The effluent containers represent a minimum storage volume of 180 $m^3$ and can also be handled by the gantry as described previously.

The two enclosed stairways 14 outside the cells 2-1 and 2-2 provide access, via footbridges 15, to the effluent containers 10d so that an operator 30 is able to inspect their content and to act on connection/disconnection valves at the channels 13a. At the four corners of each cell 2, safety cage ladders 14-1 are also installed.

The last cell 2-3 does not comprise any effluent containers 10d or any stairways 14 or any footbridges 15 since this cell is partitioned into sub-cells 2a via transverse partitions 7-1. These sub-cells of which the smallest may only contain 15 containers, namely one row of five containers on three levels, are therefore isolated from each other by isolating stop valves (not illustrated).

The retention volume of a sub-cell 2a is sized so that it is able to contain at least the total volume of a full container.

A sub-cell 2a receives products whose chemical specificities require their segregation from other products for various reasons explained below.

The effluents contained in the sub-cells 2a isolated via the transverse partitions 7-1 may comprise pumping means 13b, and are provided with large offset buried retention tanks as for the effluents of cells 2-1 and 2-2. It is the facility's safety department which decides on the suitable means for draining the sub-cells of cell 2-3 by opening valves in the direction of a cell sump buried outside the cell and by setting in operation mobile pumping means.

A laser detection system 18-1 detecting spills at the retention tanks 11 is able to detect all liquid levels. Fire extinguishing devices 18-3 are fixed to each post 9a.

An infrared fire detection system 18-2 and several explosimeter sensors are also arranged in each cell against the longitudinal walls 3*a* and preferably also on the depositing strip 5 and technical platform 20.

The storage facility is managed by a computerized management system for managing container compatibilities and their location, based on codes relating to products and their category of hazardous materials, on the identification of each container and the product contained therein via RFID markers.

The storage of products buried in cells only containing products compatible with each other, and which have side openings 16 with netting, allows for the limiting of overpressures which may damage the separating walls of the cells and enclosure or the roofing 9 which comprises pressure relief panels, in the event of explosion or fire.

The storage enclosure is entirely fenced by a fence 21 under video surveillance and comprising two access gates 21*a* at each of its longitudinal ends leading to the access to the roadway 6. The fencing 21 is nonetheless provided with several evacuation gates (not illustrated) with panic bars enabling personnel 30 present on the storage facility to escape therefrom rapidly.

The area forming the technical platform 20 receives:
the row of posts supporting the roofing 9,
one of the travel rails 8*d* for the beam 8*a* of the mobile crane,
the means 13*b* for pumping effluent,
heating units 13*c* to heat and maintain the temperature of some stored products, and
the stairwells 14*a* giving access to the footbridges 15 and to the maintenance hoppers for the various piping systems 13*a* pumping effluents from the effluent containers 10, 11*d*, and giving access to the large offset retention tanks 12.

The roofing 9 may be flat concrete roofing. However, preferably and as illustrated in FIGS. 6*a* to 6*b* the roofing has two sloped sides whose cladding is in more lightweight material in particular in the form of panels 9-2 incorporating fire-resistant rock wool confined between two sheets of steel such as Trimoterm® SNV panels made by TRIMIO (Slovenia), the said panels 9-2 being supported by a lattice metal beam framework onto which a firebreak coating is sprayed, slag wool in particular.

At all events, the said roofing comprises pressure relief panels 9-2*a* formed of steel panels incorporating fire-resistant mineral wool confined between two sheets of steel such as those manufactured by HAZ SAFE (United States). These pressure relief panels 9-2*a* have magnetic fastenings mounted on hinges capable of opening by rotation on and after a given overpressure threshold value. It is also possible to use pressure relief panels 9-2*a* mounted on fixed frames and able to rupture on an after a said given overpressure threshold value, such as those manufactured by REMBE (Germany) under reference ODU/ODV or EDP.

When no demand is placed on these pressure relief panels 9-2*a*, they ensure the seal of the roofing together with the other panels 9-2, whether they are mounted on hinges and/or on fixed frames. These pressure relief panels 9-2*a* open as soon as the overpressure on their underside reaches a threshold value, said threshold value lying between 6 and 12 millibars (typically 10 millibars) for panels mounted on hinges with magnetic fastening and 25 millibars for ODU/ODV or EDP panels made by REMBE mounted on fixed frames, so as to vent air and thereby limit destruction of the roofing after an explosion. These pressure relief panels 9-2*a* of 1 to 3 $m^2$ are regularly spaced over the surface of the roofing, in particular with 3 pressure relief panels 9-2*a* in the transverse direction YY' per roof section. A certain percentage of the surface of the roofing 9, in particular 10 to 30%, is therefore formed of pressure relief panels 9-2*a* which only open when the overpressure reaches a predefined threshold, in order to avoid too much damage to the roof supporting structure. If the pressure relief panels are not sufficient to evacuate overpressure, some steel roof plates are able to detach themselves from the roofing since the said steel plates can be individually separated from the roof frame in the event of overpressure that is too high for too long. Said second anti-debris wire nets 16*b* at the top of the posts 9*a* extend horizontally above the surface of the roofing, supported by lattice girders 9-5 secured to the posts 9*a*, the nets not being laid directly on the roofing to prevent tearing thereof, which therefore retain any expelled roof fragments. The retaining system is completed by said first wire nets or mesh 16*a* horizontally arranged on the underside of the roofing and directly secured to elements 9-4 of the roof framework (9-3) whose end purpose is firstly not to oppose air overpressure and secondly to ensure the retaining of any falling roofing fragments and finally to protect the said roofing. The said first and second nets typically have mesh sizes allowing the retaining of objects of cross-section greater than 100 $cm^2$.

FIG. 6B illustrates the right side of the roofing showing only the pressure relief panels, the remainder of the spaces 9-2*b* for the other panels 9-2 of the roofing being left open and the said second nets being removed for better highlighting of the said pressure relief panels 9-2*a*.

The panels 9-2 are mounted on the roofing framework 9-3, preferably via scored fastenings allowing them to separate themselves from the framework on and after a certain force or pressure which is higher than the said overpressure threshold value of the panels 9-2*a*, to avoid any damage to the framework in the event that the opening or rupture of the pressure relief panels 9-2*a* should be insufficient.

As a variant, the structure of the lightweight, weatherproof roofing with steel cladding can be eliminated to maintain only the horizontal wire nets or meshes 16*a*-16*b* and/or metal frames or lattice girders carried by the said posts 9*a* to prevent the outward projection of container fragments originating from the enclosure.

The posts 9*a* are sized so that, in addition to the roofing 9, they can support the structure of the mobile crane 8. The roof covering may be in steel cladding as above, but other more lightweight materials can be envisaged having fire resistance characteristics compatible with the stored hazardous materials, typically fireproof materials of class M0.

On the underside of the roofing, around the perimeter on the edge 9-1 of the roofing and at mid-height of the posts 9-*a*, there are provided two upper piping networks 17*b* used to spray two curtains of pressurized water around the entire facility, so as better to circumscribe any emission which may originate from inside the storage installation in the event of an incident.

A third circuit of pressurized water 17*a* at the bottom of the cells formed by fan-shaped water jet devices allows a surround of vertical water curtains to be set up around each column of 3 containers, even per block of three columns.

A similar circuit of pressurized water creating a water curtain using fan-shaped nozzle devices is installed on the roadway 6 against the longitudinal enclosure wall 7*a* and also ensures protection between the inside of the enclosure containing the cells 2 and the roadway 6 and trucks 6*a*.

Finally, the piping circuits for injecting foam 17*c* located at the bottom 4 of each cell and around the entire perimeter thereof, allow the comb-shaped dispensing of fire-fighting foam over the bottom of the cell in the event of an incident to extinguish or prevent a fire. This type of foam is known to the person skilled in the art under the name AFFF or FFFP emulsifier (Aqueous Film-Forming Foams, Film-Forming Fluoro-Protein Foams) and is marketed inter alia by EAU & FEU (France).

Said foam injection circuits 17c are also provided on the depositing strip 5.

In addition to an access door 14-1 to each stairway 14, the first longitudinal enclosure walls 7a on the side of the depositing strip comprise four fire-doors 14-2 giving access to the depositing strip at its two ends and at one quarter and three-quarters of its length.

The containers are grounded via anti-spark metal plates with ground connections and fitted to at least every other dwarf support wall 11 over the entire length thereof. This grounding can also be achieved by means of a conductive, anti-spark coating on the surface of the dwarf support walls e.g. Metal Qualitop manufactured by ROCLAND (France). Each column of containers is grounded via the lowermost container which rests directly in contact with the dwarf wall having the conductive surface. Also a lightning conductor 16c mounted on the roofing ensure protects the facility of the invention against lightning strikes.

Before entering the storage facility 1, every container undergoes visual inspection of its outside condition by an operator 30. If no anomaly is detected by the operator, the latter affixes an RFID marker containing important data (container reference, UN code, dangerous good category, product name, tonnage, etc . . . ). RFID sensors affixed at the entrance and exit 21a of the storage facility identify whether or not a container is present inside the storage installation. The positioning of the container in a said cell or sub-cell is determined by an automated system in relation to the type of product and programmed future handling operations.

Once the container is in place, it is geographically located by the operator 30 and the information is sent to the automated system ensuring the supervision of the storage facility.

The end purpose of the storage facility of the invention is to store dangerous goods (hereinafter DGs) packaged in ITUs and authorized to travel by road or rail (with the exception of class 1 (explosives), class 6.2 (infectious substances) and class 7 (radioactive material), in the safest manner possible for a time that is at least equal to the regulatory inspection time of the ITU. All the characteristics and devices of the storage facility described above are intended to limit the effects of an incident via operational means adapted to the type of incident and the type of products involved. Therefore the storage facility meets the following four main problems:

1. Avoiding any direct contact of an ignition source with the stored products. This particularly entails:
    the non-entry of vehicles carrying ITUs into the storage cells,
    the installation of electric equipment combined with detection means 18 for detecting leaks and explosive atmosphere prohibiting any handling operation as soon as an anomaly is detected.
2. Segregating the dangerous goods in relation to their transport category by applying segregation rules directly taken from the IMDG code (International Maritime Dangerous Goods code) for container cargos stowed "on deck" on container ships. This implies:
    systematic traceability of the goods and related container as soon as an ITU of DGs enters the storage and up until it leaves the storage,
    partitioning of the storage, paying heed to compatibility rules to prevent any reaction phenomena resulting from the mixing of two products, and
    adapting treatment of any leakage to the type of product concerned.
3. In the event of a spill, channelling the spill towards the large offset retention tank 12 then triggering a suitable pumping process in relation to the type of product concerned by the spill. The targeted objective: to avoid any sheet formation underneath the containers which may ignite a fire by channelling any leaks to outside the storage area and rapidly re-packaging the same in holding capacities held readily available.
4. In the event of an incident (fire, explosion, flying debris) limiting the impact thereof to the boundaries of the site occupied by the facility (limitation of zones Z1 corresponding to the lethal effect threshold and Z2 the threshold of significant effects to within the perimeter of the logistic platform in which the storage is integrated).

Dangerous goods, in accordance with the ADR agreement (Accord européen relatif au transport international des marchandises Dangereuses par Route—European agreement on the international carriage of dangerous goods by road) are divided into different classes according to the type of hazard they present. Numerous goods have several hazardous properties however: some can be both flammable and toxic, or they may be both toxic and corrosive. In such cases, the goods are stowed with the class that corresponds to the greatest hazard during transport.

Advantageously, the segregation rules for DGs applied to the storage facility are taken directly from the IMDG code by likening the installation to a container ship.

The segregation rules were established by similarity with those defined in Chapter 7.2 "Segregation of materials" in the 2008 IMDG Code, by applying to the storage the provisions laid down by the IMDG Code for "on deck stowage" of cargoes.

The application of these rules translates at storage level as the following rules for distribution:
    Each class or division identified in the table of compatibility is allocated a cell 2 or sub-cell 2A where only those DGs belonging to the same class or division will be stored,
    Each sub-cell, which is the minimum storage entity, is sized to receive longitudinally 2 20-foot ITUs i.e. a maximum capacity per sub-cell of 30 20-foot ITUs representing a maximum storage volume of 720 $m^3$, this type of ITU being the most frequent for maritime packaging. Each sub-cell 2a is provided longitudinally with a space for free movement sized so that there is a minimum distance of 3 meters horizontally separating 2 ITUs stored in 2 adjacent sub-cells 2a.

Flammable DGs of class 3 (liquids), which represent the majority of DGs to be stored, are stored in one same cell having an automated device for pumping any spills so that these DGs which may ignite are rapidly repackaged. The layout of the cell is sized for example to receive 80% of 20-foot containers and 20% of 30-foot containers.

Some special precautions are required as follows:
    The sub-cells 2a containing class 5.1 DGs (oxidizing substances) are to be located as far away as possible from cells containing flammable DGs (classes 2.1, 3 and 4)
    Class 8 is sub-divided into 2 sub-classes:
        base corrosive substances
        acid corrosive substances
        each of these 2 sub-classes is provided with sub-cells 2a which are fully separate in order to prevent any reaction phenomena which could be caused by mixing an acid corrosive DG with a base corrosive DG.

Each DG confined in a sub-cell 2a has a specific secondary containment held isolated from the containment of the main cell. The placing in communication of this secondary containment with the pumping means of the main containment may be possible in some cases. This operation will not be automatic but can be implemented by operating personnel only after verification that it is danger-free. Otherwise specific pumping means must be used.

The cells containing class 9 DGs are used as buffer cell between the cells of class 8 acid/class 8 base/class 4.2 substances liable to spontaneous combustion.

In order to guarantee these different rules of compatibility, the storage facility is composed of 3 main cells 2-1, 2-2 and 2-3:

Cell 2-1 "FLAMMABLE DGs" comprises class 3 flammable DGs with an effluent containment at the bottom (or floor) of the cell common to the entire cell. It is permanently connected to its large, offset retention tank 12 which is provided with an automatic shut-off device (not illustrated) such as a gate valve closing the drainage channel, isolating it from the cell 2-1. The large, offset retention tank is connected to the columns of effluent containers 10-d which are provided with specific confinement via transverse firewalls so that they are fully segregated from the containers stored in cell 2-1.

Cell 2-2 "MIXED DGs" comprises class 8 corrosive substances with physical separation between acid and base corrosive DGs, miscellaneous class 9 substances and class 4.2 substances liable to spontaneous combustion. The bottom of the cell is partitioned into 8 effluent containments 11a which can be isolated from the large offset retention tank 12.

Cell 2-3 "SPECIFIC DGs" comprises DGs of classes 2.1, 2.2, 2.3, 4.1, 4.3, 5.1, 5.2, 6.1 with full-height partitioning 7-1 into sub-cells 2a that are fully independent of each other, provided with specific prevention 17a-17c and pumping means 13c.

A basic cell receives 5 rows of 20-foot or 30-foot ITUs on 3 levels (Level 0=surface of the roadway 6).

The outer dimensions of ITUs are standardized for 20-foot maritime containers: height H=2.591 m; width l=2.438 m, length L=6.058 m. For 30-foot containers only the length differs, L being=9.10 m.

The storage facility described in this example has the following overall dimensions:
total length of about 350 m and
total width of about 45 m.

The firewalls (3a, 3b) of the buried cells have the following dimensions:
Thickness: 0.4 m
Height from the bottom of the cell:
8 m for wall 3a (on the side of the depositing area) surmounted by 1 m for the dwarf wall 3a' acting as guard rail for the depositing area, and
12 m for walls 3a-7a' on the side opposite the depositing area, i.e. 8 m for wall 3a and 4 m for wall 7a'.

Each supporting dwarf wall 11 is provided with slots at the upper part to receive gratings 11d allowing movement between the rows 10b of ITUs on a flat surface.

The slope of the bottom 4 of the cell is 1.5% with a double slope converging towards the middle of the cell floor.

A drainage channel lib particularly visible in FIG. 4a is sloped in the direction of a large offset retention tank 12 buried in a median area, with a slope of 2%.

The enclosure firewalls 7a between the depositing strip and the roadway 6 have a thickness of 0.4 m and a height of 4 m.

The posts 9a supporting the roofing 9 and the storage handling gantry 8 have a thickness of 1 m and height of 14 m.

The transverse enclosure firewalls 7b have a thickness of 0.4 m and a height of 7 m.

The height H1 between the upper end of the transverse enclosure walls 7b and the roofing 9 is about 7 m.

The geometry of the storage handling gantry 8 is:
range of 22.6 m between row 10b the furthest from the roadway 6 and the said roadway
span of 28.85 m (corresponding to the centre-to-centre distance of the 2 travel rails 8d of the second carriages 8e)
a maximum height below the traction frame 8c of the storage handling gantry 8 of 8.75 m.

The movements of the storage handling gantry 8 when loaded are of limited extent since the driver of the delivery truck 6a, after passing through the facility's reception, is informed of the point on which to position the vehicle assembly on the roadway in order to be able to collect or deposit its ITU. This enables the operator 30, informed by reception of the coming handling operation, to pre-position the storage handling gantry 8 opposite the receiving cell during the lapse of time it takes the driver to arrive from reception. A servo safety system ensures permanent control of the altimetry of the bottom part of an ITU during handling by the gantry and of any obstacle.

GPS positioning of the ITUs and the command system for controlling the storage handling gantry 8 with exact mapping of the storage installation allow the providing of highly precise data on the X, Y and Z coordinates of the container and of the point where the container must be positioned to carry out the handling operation.

A single operator per station receives the driver of the truck 6a and carries out the following different handling operations:
acquiring the "RFID signature" of the ITU entering or leaving the installation,
validating the handling process as per the supervision software which optimizes the management of full cells and empty cells according to product type and the operations programmed for the day and following days,
conducting the handling operation with a portable radio console to control the storage handling gantry 8 from the depositing area 5 which can be accessed from the roadway 6 via 3 gates, and
acquiring, if necessary, the geographic location of the ITU inside the storage facility.

Evidently the example of embodiment given above is in no way limiting, and other improvements and details can be made to the facility of the invention without departing from the scope of the invention in which, for example, other configurations and/or numbers of cells can be provided in the installation and in which other forms of depositing strip and/or roadway and/or handling gantry and/or roofing can be envisaged.

FIGS. 7A and 7b therefore illustrate an installation according to the invention which has been improved upon compared with the example described above with reference to FIGS. 1 to 6B, and in which provision is made for at least one rail transport line 22 (even several rail transport lines) and gravity conveying means 23, 24 between the rail transport line(s) 22 and the storage handling gantry 8, and conversely.

For this improved installation, the rail transport line 22, of rail track type, is located outside the facility on the roadway 6 side. In other words, the rail transport line 22 is located outside the structure defined partly by the roofing 9 and posts 9a, so that the said posts 9a are located between the rail transport line 22 and the roadway 6.

In this improved installation, the fencing 21 and the fire engine access road 19 (not illustrated in FIGS. 7A and 7B) are offset or placed distant outside the installation, compared with the facility described above with reference to FIGS. 1 to 6B, so as to leave room for the rail transport line 22 and conveying devices 23, 24.

The rail transport line 22 extends in the longitudinal direction XX', parallel to the roadway 6 and to the cells 2.

The facility further comprises at least one outside motorized container handling gantry 26 (even several outside handling gantries 26) comprising a beam 26a extending in the said transverse direction YY' above the rail transport line 22, the said beam 26a comprising means of groove or slide type to guide a carriage 26b capable of moving a container 10, hung by a grappler frame 26c from the said carriage 26b, horizontally along the said beam 26a in the transverse direction YY' from a wagon 27 on the rail transport line 22 towards conveying devices 23, 24, then vertically downwards onto the conveying devices 23, 24.

The conveying devices 23, 24, under gravity, allow the conveying of the containers 10 between the rail transport line 22 and an annex handling area 25 accessible to the storage handling gantry 8. This annex handling area 25 forms an area for depositing and receiving containers 10 derived either from the rail transport line 22, or from the cells 2 and destined for the rail transport line 22.

This annex handling area 25 extends along the roadway 6, parallel to the longitudinal direction XX', and is located underneath the roofing 9 and hence inside the structure defined partly by the roofing 9 and the posts 9a.

In this improved installation, the beam 8a of the storage handling gantry 8 extends in the transverse direction YY', above the roadway 6 and also above the annex handling area 25; the first carriage 8b being capable of moving a container 10 hung by the grappler frame 8c from said first carriage 8b in the transverse direction YY' at a height greater than the height of a truck 6a towards above the annex handling area 25 and conveying devices 23, 24, then vertically from a certain height down onto the conveying devices 23, 24. This annex handling area 25 therefore forms a handling area for this storage handling gantry 8.

The gravity conveying devices 23, 24 are in the form of gravity transporters with rollers respectively comprising a succession of rollers, in particular in steel, mobile in rotation on a chassis, and defining a slope relative to the horizontal of less than 4%, such as a slope of 2%.

Each conveying device 23, 24 has:
an upper end 23a, 24a for depositing containers 10 on which the containers 10 are deposited; and
a lower end 23b, 24b for receiving containers 10, on which the containers 10 are received after naturally following the slope under gravity by sliding on the rollers of the upper end 23a, 24a as far as the lower end 23b, 24b.

There exist two types of conveying device, namely:
a first conveying device 23 whose upper end 23a is located on the side of the rail transport line 22, and whose lower end 23b is located on the side of the annex handling area 25, to allow conveying of the containers 10 from the rail transport line 22 (or more specifically from the outside handling gantry 26) towards the annex handling area 25 (and hence towards the storage handling gantry 8) so that they can be received by the said storage handling gantry 8 and stored in a suitable cell; and
a second conveying device 24 whose upper end 24a is located on the side of the annex handling area 25, and whose lower end 24b is located on the side of the rail transport line 22 (or more specifically of the outside handling gantry 26) to allow conveying of the containers 10 from the annex handling area 25 towards the rail transport line 22.

These conveying devices 23, 24 extend between the posts 9a of the roofing 9 with a length of between 9 and 14 meters for example. The first conveying devices 23 are identical to the second conveying devices 24 with the exception of their orientation. Therefore, the first conveying devices 23 are mounted head-to-tail with the second conveying devices 24.

As a variant, the conveying devices 23 and 24 may be made from one same type of gravity transporter equipped at its ends with pneumatic or hydraulic cylinders used to adjust their respective slopes and thereby achieve slope inversion of the conveying devices 23, 24 under consideration.

As can be seen in FIG. 7B, the installation may comprise one or more groups of several first conveying devices 23 that are adjacent and parallel to each other so that it is possible to convey a container 10 on several first conveying devices 23 of one same group. Similarly, the facility may comprise one or more groups of second adjacent conveying devices 23 parallel to each other.

These conveying devices 23, 24 thereby allow the containers 10, in two handling operations, to be moved from the wagon 27 on the rail transport line 22 as far as the semi-buried storage cell corresponding to its class of product:
a first handling operation: the container 10 is deposited via one of the outside handling gantries 26 onto the upper end 23a of a first conveying device 23 whose slope brings it to the lower end 23b and hence to the annex handling area 25 forming a handling area for the storage handling gantry 8; and
a second handling operation: the storage handling gantry 8 takes the container from the lower end 23b of the first conveying device 23 and moves it to the suitable cell 2.

These conveying devices 23, 24 also allow the containers 10 to be moved in two handling operations from the semi-buried storage cell where the container 10 under consideration is stored, as far as the wagon 27 on the rail transport line 22:
a first handling operation: the storage handling gantry 8 collects the container 10 from the buried storage cell 2 and deposits it on the upper end of a second conveying device 4 whose slope brings the container as far as the lower end 24b allowing reception thereof by the outside handling gantry 26 operating outside the facility; and
a second handling operation: the outside handling gantry 26 picks up the container 10 and deposits it on the wagon 27 which is to transport the container 10 to its end destination.

In one variant, non-illustrated, the storage facility is equipped with rail transport lines 22 and with gravity conveying devices 23, 24 either side of each cell 2, to allow exchanges of containers 10 in no more than two handling operations between the semi-buried storage cells 2 and annex handling areas 25 located either side of the storage facility in the longitudinal direction XX' thereof.

The invention claimed is:
1. A semi-buried storage facility for hazardous materials packaged in containers comprising:
at least one cell extending in a longitudinal direction XX', and delimited by buried vertical firewalls forming a pit containing the containers containing hazardous materials of different categories, and each cell of the at least one cell being surrounded by an enclosure, said enclosure comprising vertical firewalls extending above the ground, and at least one depositing and receiving area for containers comprising a roadway for trucks and/or a handling area for containers arriving from or destined for a rail transport line, the depositing and receiving area extending in the longitudinal direction XX' outside a longitudinal enclosure wall over at least the entire length of the cell or cells, and a corridor-shaped depositing strip inside each enclosure extending in the longitudinal direction XX' between each cell of the at least one cell and the longitudinal enclosure wall, and a motor-driven container-handling gantry capable of moving a container suspended between the at least one depositing and receiving area and a cell of the at least one cell, horizontally in a transverse direction YY' at a height greater than the height of the enclosure walls, then vertically down to the bottom of each cell, the gantry being capable of being moved in the longitudinal direction XX' above the enclosure walls.

2. The storage facility according to claim 1, wherein it further comprises roofing whose cladding comprises or cooperates with means preventing the passing through the roofing of objects of a size greater than 0.1 m$^2$ and comprising or cooperating with means for evacuating air through the roofing in the event of overpressure on the underside of the roofing, the roofing being supported by posts, the roofing covering at least the enclosure and the gantry and the space between the upper end of the enclosure walls and the roofing not impeding the circulation of air between the inside and outside of the facility in the space.

3. The storage facility according to claim 2, wherein the roofing comprises a cladding which is a closed weatherproof cladding comprising regions called overpressure regions capable of opening in the event of overpressure on the underside of the roofing, the roofing further comprising roof wire nets, mesh, or grating on the underside of the roofing and/or above the roofing at least in front of the overpressure regions.

4. The storage facility according to claim 3 wherein the roofing comprises a metal beam framework supporting the cladding formed of panels in steel and/or fireproof composite material, some of the panels being pressure relief panels that are capable of opening or rupturing on and after a given overpressure value between the underside of the roofing and the outside above the roofing in front of the pressure relief panels.

5. The storage facility according to claim 1 wherein: each cell open on the topside is laterally delimited by four buried, vertical firewalls resting on a floor, the four vertical walls comprising two longitudinal cell walls extending parallel in a longitudinal direction XX' and two transverse cell walls extending parallel in a transverse direction YY' perpendicular to the longitudinal direction XX' between the two longitudinal cell walls, and each enclosure comprises four vertical firewalls comprising two longitudinal enclosure walls extending over a height of at least 4 m above the ground parallel in a longitudinal direction XX' and two transverse enclosure walls extending parallel in a transverse direction YY' perpendicular to the longitudinal direction XX' between the two longitudinal enclosure walls, the two transverse enclosure walls being of greater height than the longitudinal enclosure walls, and the at least one depositing and receiving area extends in the longitudinal direction XX' outside first longitudinal enclosure wall(s) over at least the entire length of the cell(s), and the corridor-shaped depositing strip inside each enclosure extending in the longitudinal direction XX' between each said buried cell and the longitudinal enclosure wall, and the motor-driven container handling gantry capable of moving a container of the containers, hung from a first carriage, horizontally along a beam in the transverse direction YY' at a height greater than the height of the longitudinal enclosure walls, at a height lower than the height of the transverse enclosure walls, then vertically down to the bottom of a cell of the at least one cell onto a floor, and the beam cooperating with a guiding means comprising longitudinal-guiding rails or slides and with carriages that move the beam along the guiding means above the transverse enclosure walls in the longitudinal direction XX'.

6. The storage facility according to claim 2 wherein the roofing is positioned at a height H1 above the upper end of the transverse enclosure walls, H1 having to allow the longitudinal movement of the unloaded gantry above the transverse walls, and the transverse movement of a container hung from the gantry above the longitudinal enclosure walls, but preventing the longitudinal movement of a container hung from the gantry above the transverse enclosure walls.

7. The storage facility according to claim 5 wherein it comprises at least three cells successively in the longitudinal direction XX' having one same width in the transverse direction YY', and two adjacent successive cells have in common a transverse enclosure wall of greater height than the longitudinal enclosure walls, and the longitudinal enclosure walls of the different cells form, on each side, one same longitudinal enclosure wall continuous over the entire length of the facility, the second longitudinal enclosure wall located on the side opposite the side of the depositing strip extends in the height-wise continuity of the longitudinal cell walls and forms one same longitudinal enclosure wall therewith, and the transverse enclosure walls extend in the height-wise continuity of the transverse cell walls and form one same wall therewith.

8. The storage facility according to claim 1 wherein at least one cell comprises channeling means capable of directing effluent from the bottom floor of the at least one cell towards a large retention tank of volume at least equal to that of a container of the containers, the large retention tank being offset outside the at least one cell.

9. The storage facility according to claim 1 wherein the bottom of each cell is partitioned by supporting dwarf walls rising above a floor, each container at the bottom of a cell of the at least one cell or column of containers resting on two supporting dwarf walls delimiting effluent containments underneath the container or column of containers, and the floor is slightly sloped towards a transverse sloped drainage channel that directs the effluent from the containments towards a large retention tank outside the cell.

10. The storage facility according to claim 1 wherein the at least one cell comprises at least one column of effluent containers for receipt of effluent, the effluent having initially escaped from containers filled with hazardous material towards the bottom floor of the at least one cell, then towards a large retention tank offset outside the at least one cell, and in that the effluent containers collect the effluent retained in the large retention tank conveyed via channels between the large retention tank and the effluent containers pumped by pumping means installed outside the at least one cell.

11. The storage facility according to claim 10 wherein the cell comprises at least one enclosed stairway buried outside the cell providing access to the height of each effluent container of the column of effluent containers for inspection of the effluent containers.

12. The storage facility according to claim 1 wherein at least one cell is partitioned by inner transverse partitions of a same height as the longitudinal cell walls, so as to delimit sub cells isolated from each other inside the at least one cell.

13. The storage facility according to claim 2, wherein the facility comprises an outside wire mesh or netting protecting against flying debris, and extending vertically from the edges of the roofing down below the upper end of the longitudinal enclosure walls and the transverse enclosure walls.

14. The storage facility according to claim 1, further comprising:
- detection means to detect leaks of products contained in the containers onto the floor of the at least one cell, and
- fire and explosion detection means inside the at least one cell, and
- means for injecting pressurized water in the form of vertical curtains of water on the periphery of the at least one cell, and
- devices to ground all the containers, as well as a lightning conductor ensuring protection of the storage facility against lightning strikes.

15. A method for storing hazardous materials packaged in containers, said method comprising the steps of:
1) providing a storage facility for the hazardous materials, the storage facility comprising:
    at least one cell; and
    at least one depositing and receiving area comprising a roadway, a handling area, and an enclosure,
    a depositing strip inside each enclosure, and
    a container-handling gantry;
2) transporting a container of the containers to the at least one depositing and receiving area as far as the level of a cell of the at least one cell intended to receive the category of hazardous materials contained in the container to be stored by moving a truck delivering containers along the roadway, or by moving a wagon delivering containers on a rail transport line and conveying the container from the wagon to the handling area, the containers being placed in the different cells in relation to the type and/or class of hazardous material of the product contained in the container,
3) moving a container of the containers from the at least one depositing and receiving area to the depositing strip by means of the handling gantry by moving the container from the truck travelling on the roadway, or by moving the container originating from the wagon from the handling area, and
4) moving a said container of the containers from the depositing strip to inside the cell by means of the handling gantry, the containers being deposited on supporting dwarf walls at the bottom of the cell or on top of a column comprising one container or two stacked containers.

16. The storage facility according to claim 5, wherein the two transverse enclosure walls have a height of at least 7 m.

* * * * *